US012632066B2

(12) United States Patent
Yasuyama et al.

(10) Patent No.: US 12,632,066 B2
(45) Date of Patent: May 19, 2026

(54) VEHICLE RUNNING CONTROL SYSTEM BASED ON TRACK ENVIRONMENT INFORMATION

(71) Applicant: TOYOTA JIDOSHA KABUSHIKI KAISHA, Toyota (JP)

(72) Inventors: Shogo Yasuyama, Okazaki (JP); Takeshi Kanou, Seto (JP); Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 18/598,141

(22) Filed: Mar. 7, 2024

(65) Prior Publication Data

US 2024/0319740 A1 Sep. 26, 2024

(30) Foreign Application Priority Data

Mar. 24, 2023 (JP) ................................. 2023-047745

(51) Int. Cl.
| | |
|---|---|
| *G05D 1/617* | (2024.01) |
| *G05D 1/221* | (2024.01) |
| *G05D 107/70* | (2024.01) |
| *G05D 109/10* | (2024.01) |
| *G05D 111/30* | (2024.01) |
| *G06V 20/52* | (2022.01) |

(52) U.S. Cl.
CPC ............. *G05D 1/617* (2024.01); *G05D 1/221* (2024.01); *G06V 20/52* (2022.01);
(Continued)

(58) Field of Classification Search
CPC .. G05B 19/4061; G05B 19/418; G05B 17/02; G06T 7/73; G06T 7/0004; G06T 7/00;
(Continued)

(56) References Cited

U.S. PATENT DOCUMENTS

| | | | | |
|---|---|---|---|---|
| 2007/0195089 A1* | 8/2007 | Furukado | ................. | G06T 7/73 |
| | | | | 345/426 |
| 2011/0054823 A1* | 3/2011 | Long | ................... | G01M 17/007 |
| | | | | 702/182 |

(Continued)

FOREIGN PATENT DOCUMENTS

| | | | | |
|---|---|---|---|---|
| CN | 108490935 A | * | 9/2018 | ........... G05D 1/0246 |
| CN | 108490937 A | * | 9/2018 | ............. G08C 17/02 |

(Continued)

*Primary Examiner* — Yuri Kan

(74) *Attorney, Agent, or Firm* — Oblon, McClelland, Maier & Neustadt, L.L.P.

(57) ABSTRACT

A system comprises: a remote controller that causes a vehicle to run by remote control, the vehicle being capable of running along a track in a factory during a course of manufacture, the vehicle including a vehicle communication unit and a driving controller, the vehicle communication unit having a communication function, the driving controller implementing driving control over the vehicle; a track information acquisition unit that acquires track information that is information about an environment of a track on which the vehicle is configured to run by the remote control; and a running method determination unit that determines a running method using the acquired track information, the running method including at least one of a possibility or impossibility of running of the vehicle and a running route along which the vehicle is to run.

7 Claims, 13 Drawing Sheets

(52) U.S. Cl.
CPC ..... *G05D 2107/70* (2024.01); *G05D 2109/10* (2024.01); *G05D 2111/30* (2024.01); *G06V 2201/07* (2022.01); *G06V 2201/08* (2022.01)

(58) Field of Classification Search
CPC .... G06F 21/53; G05D 1/0214; G05D 1/0212; G05D 1/0246; G01M 17/007; G06V 20/597; G08C 17/02
See application file for complete search history.

(56) References Cited

U.S. PATENT DOCUMENTS

| | | | | |
|---|---|---|---|---|
| 2014/0044312 A1 * | 2/2014 | Ehlgen | ..................... | G06T 7/00 |
| | | | | 382/104 |
| 2017/0320529 A1 * | 11/2017 | Nordbruch | .......... | G05D 1/0212 |
| 2020/0409352 A1 * | 12/2020 | Caldwell | ............. | G05D 1/0214 |
| 2021/0080976 A1 * | 3/2021 | Tadano | ............... | G05B 19/418 |
| 2022/0148221 A1 * | 5/2022 | Wagner | ................ | G06T 7/0004 |
| 2022/0242447 A1 | 8/2022 | Nagura et al. | | |
| 2022/0289253 A1 * | 9/2022 | Hu | .......................... | G06F 21/53 |
| 2023/0005177 A1 * | 1/2023 | Stanek | ..................... | G06T 7/73 |

FOREIGN PATENT DOCUMENTS

| | | | | | | |
|---|---|---|---|---|---|---|
| CN | 113173167 A | * | 7/2021 | .......... | G06V 20/597 |
| CN | 114200849 A | * | 3/2022 | ............ | G05B 17/02 |
| JP | 2017-538619 A | | 12/2017 | | |
| JP | 2018-105967 A | | 7/2018 | | |
| JP | 2021-068132 A | | 4/2021 | | |
| JP | 2022-129103 A | | 9/2022 | | |
| WO | WO 2017/079321 A1 | | 5/2017 | | |

\* cited by examiner

VEHICLE

START

RECEIVE RUNNING CONTROL SIGNAL FROM SERVER    S5

CONTROL ACTUATOR USING RUNNING CONTROL SIGNAL    S6

END

SERVER

START

ACQUIRE VEHICLE LOCATION INFORMATION USING DETECTION RESULT FROM EXTERNAL SENSOR    S1

DETERMINE NEXT TARGET LOCATION    S2

GENERATE RUNNING CONTROL SIGNAL    S3

TRANSMIT RUNNING CONTROL SIGNAL TO VEHICLE    S4

END

VEHICLE

START

S101
ACQUIRE VEHICLE LOCATION INFORMATION USING DETECTION RESULT FROM EXTERNAL SENSOR

S102
DETERMINE NEXT TARGET LOCATION

S103
GENERATE RUNNING CONTROL SIGNAL

S104
CONTROL ACTUATOR USING RUNNING CONTROL SIGNAL

END

VEHICLE RUNNING CONTROL SYSTEM BASED ON TRACK ENVIRONMENT INFORMATION

CROSS REFERENCE TO RELATED APPLICATIONS

The present application claims priority from Japanese patent application JP2023-047745 filed on Mar. 24, 2023, the disclosure of which is hereby incorporated in its entirety by reference into the present application.

BACKGROUND

Field

The present disclosure relates to a system.

Related Art

For example, Japanese Patent Application Publication (Translation of PCT Application) No. 2017-538619 discloses a vehicle running method of causing a vehicle to run by remote control in a manufacturing system for manufacture of the vehicle from an end of an assembly line of the manufacturing system to a parking area of the manufacturing system.

SUMMARY

The state of a track along which the vehicle is to run by remote control may change depending on time, a season, weather, etc. in which the vehicle is to run. This generates a demand for a technique for causing the vehicle to run along an appropriate running route responsive to a state of the track.

The present disclosure is feasible in the following aspects.

(1) According to one aspect of the present disclosure, a system is provided that is used in a factory for manufacture of a vehicle. The system comprises: a remote controller that causes the vehicle to run by remote control, the vehicle being capable of running along a track in the factory during a course of manufacture, the vehicle including a vehicle communication unit and a driving controller, the vehicle communication unit having a communication function, the driving controller implementing driving control over the vehicle; a track information acquisition unit that acquires track information that is information about an environment of a track on which the vehicle is configured to run by the remote control; and a running method determination unit that determines a running method using the acquired track information, the running method including at least one of a possibility or impossibility of running of the vehicle and a running route along which the vehicle is to run.

According to the system of this aspect, by using the track information, it becomes possible to determine an appropriate running method of causing the vehicle to run responsive to the state of the track.

(2) The system of the above-described aspect may further comprise a radio communication unit for making radio communication with the vehicle communication unit. The track information may include a state of communication between the vehicle communication unit on the track and the radio communication unit.

According to the system of this aspect, it is possible to determine an appropriate running method of causing the vehicle to run responsive to a state of communication with the radio communication unit for remote control.

(3) In the system of the above-described aspect, the state of the communication may be at least one of radio field strength at the radio communication unit and channel utilization at the radio communication unit.

According to the system of this aspect, it is possible to determine an appropriate running method of causing the vehicle to run responsive to at least one of the radio field strength at the radio communication unit and the channel utilization at the radio communication unit.

(4) In the system of the above-described aspect, the track information may include weather information at the track, the weather information including at least one of a sunshine duration at the track and a temperature at the track.

According to the system of this aspect, it is possible to determine an appropriate running method of causing the vehicle to run responsive to the sunshine duration at the track and the temperature at the track.

(5) In the system of the above-described aspect, the track information may include information including at least one of information about construction carried out on the track and information about a stopped vehicle on the track.

According to the system of this aspect, it is possible to avoid locations disabling running of the vehicle on the basis of the construction to be carried out on the track and the stopped vehicle on the track.

(6) The system of the above-described aspect may further comprise at least one camera capable of acquiring an image of the vehicle used for the remote control. The track information may be acquired using an image captured by the camera.

According to the system of this aspect, by using the image captured by the camera used for the remote control as the track information, it becomes possible to determine an appropriate running method of causing the vehicle to run responsive to the captured image used for the remote control.

(7) In the system of the above-described aspect, the track information may include information indicating a state of recognition of a target in an image of the target acquired by the camera.

According to the system of this aspect, it is possible to determine an appropriate running method of causing the vehicle to run responsive to the recognition state in the image captured by the camera used for remote control.

(8) In the system of the above-described aspect, the running method determination unit may implement evaluation about the state of recognition of the vehicle by the camera using at least one of information about an angle of light entering the camera and information about a quantity of light entering the camera, and may determine the running method using result of the evaluation.

According to the system of this aspect, by determining a running method using the angle of light or the quantity of light entering the camera, it becomes possible for the determined running method of causing the vehicle to run to be a method capable of reducing the occurrence of a trouble in image analysis that might be caused by the light.

(9) In the system of the above-described aspect, the track information acquisition unit may acquire a nominal value about solar elevation given from an external agency. The running method determination unit may implement the evaluation using the nominal value about the solar elevation as the information about the angle of the light entering the camera.

According to the system of this aspect, it is possible to determine a running method of causing the vehicle to run capable of reducing the occurrence of a trouble in image analysis through the simple way using the nominal value about solar elevation.

(10) In the system of the above-described aspect, the running method determination unit may implement the evaluation using at least one of a type of aerosol and an amount of the aerosol as the information about the quantity of the light entering the camera.

According to the system of this aspect, it is possible to evaluate the state of recognition of the vehicle by the camera through the simple way omitting process such as image analysis on the captured image.

(11) In the system of the above-described aspect, the track information acquisition unit may acquire a nominal value about at least one of the type of the aerosol and the amount of the aerosol given from an external agency. The running method determination unit may implement the evaluation using the nominal value.

According to the system of this aspect, it is possible to judge the state of recognition of the vehicle through the simple way of acquiring the nominal value.

(12) The system of the above-described aspect may further comprise: a first camera located on a first track belonging to the track, the first camera being capable of acquiring an image of the vehicle on the first track; and a second camera located on a second track belonging to the track, the second camera being capable of acquiring an image of the vehicle on the second track, the second track being different from the first track. When the running method determination unit sets the running route to the first track using the track information, a state of recognition of the vehicle in an image of the vehicle acquired by the first camera may be better than a state of recognition of the vehicle in an image of the vehicle acquired by the second camera.

According to the system of this aspect, it is possible to cause the vehicle to run along a running route providing a favorable recognition state.

(13) In the system of the above-described aspect, when the running method determination unit sets the running route to the first track, a quantity of light entering the second camera may be larger than a quantity of light entering the first camera.

According to the system of this aspect, it is possible to cause the vehicle to run along a running track that reduces the occurrence of a trouble in image analysis such as overexposure.

(14) The system of the above-described aspect may further comprise: a first camera located on a first track belonging to the track, the first camera being capable of detecting an image of the vehicle on the first track; and a second camera located on a second track belonging to the track, the second camera being capable of detecting an image of the vehicle on the second track, the second track being different from the first track. When a state of recognition of the vehicle is worse than a predetermined standard state on both the first track and the second track, the running method determination unit may determine to stop running of the vehicle.

According to the system of this aspect, it is possible to prevent the vehicle from running while driving control by remote control is unstable.

The present disclosure is feasible in various aspects other than the system. For example, the present disclosure may be realized in aspects including a vehicle, a server, a method of causing a vehicle to run, a running route determination method, a method of manufacturing a vehicle, a method of controlling a vehicle, a computer program realizing such a control method, and a non-transitory recording medium storing such a computer program.

BRIEF DESCRIPTION OF THE DRAWINGS

FIG. 5 is a first explanatory view showing an example of change in a running route by a running method determination unit using track information;

FIG. 6 is a second explanatory view showing an example of change in a running route by the running method determination unit using track information;

DETAILED DESCRIPTION

A. First Embodiment

Figure 1:
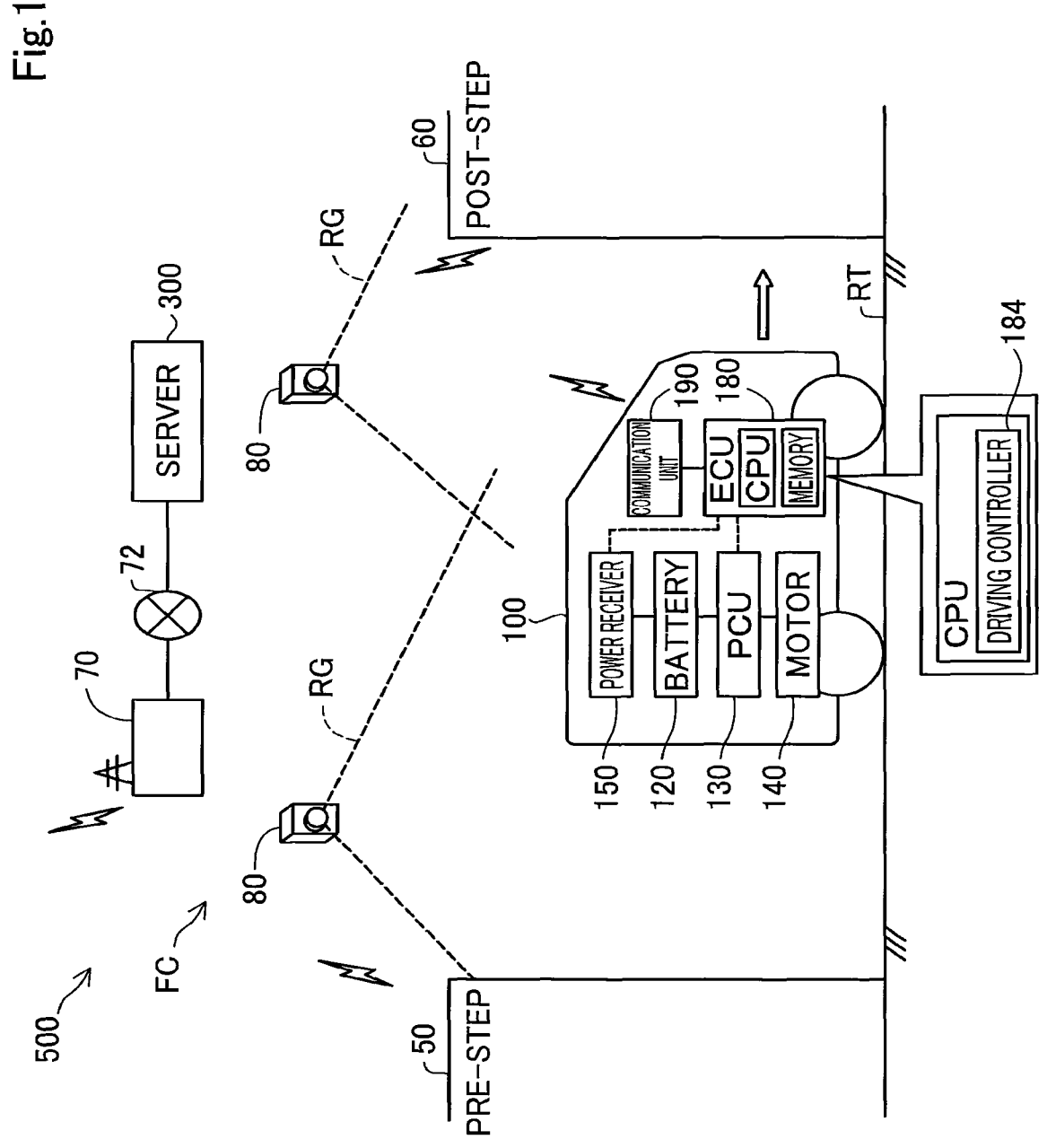
FIG. 1 is an explanatory view showing a schematic configuration of a system according to a first embodiment.

FIG. 1 is an explanatory view showing a schematic configuration of a system 500 according to a first embodiment. The system 500 of the present embodiment is configured as a system. The system 500 controls automatic driving of a vehicle 100 as a moving object by remote control. The system 500 is capable of causing the vehicle 100 to run automatically by remote control during a course of manufacture, for example, in a factory FC for manufacture of the vehicle 100. In the present specification, a state finished as a product, and a state as a semifinished product and a state as an in-process item during manufacture are collectively called a "vehicle."

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

As shown in FIG. 1, the factory FC is provided with a pre-step 50, a post-step 60, a track RT for the vehicle 100, and an access point 70. The access point 70 functions as a radio communication unit for making radio communication with the vehicle 100. The track RT is a transport zone for the vehicle 100 in the factory FC connecting the pre-step 50 and the post-step 60 to each other. "Being in the factory FC" may include a standby place where, after the vehicle 100 is finished, the finished vehicle 100 is on standby waiting to be loaded for shipment, and a track to the standby place. Each of a step in the factory FC and a step during the course of manufacture is not limited to a case where the step exists in one building, at one site, or at one address, etc. Each of a step in the factory FC and a step during the course of manufacture may extend across a plurality of buildings, a plurality of sites, or a plurality of addresses, for example. "Running of the vehicle 100 in the factory FC" includes not only a case where the vehicle 100 runs along a track in a factory existing in one place but also cases where the vehicle 100 runs in transport zones between a plurality of factories at a plurality of places and between a plurality of steps at a plurality of places. "Running of the vehicle 100 in the factory FC" includes a case where the vehicle 100 runs not only on a private road but also on a public road for moving between factories located at a plurality of places and for moving between steps at a plurality of places, for example.

The pre-step 50 is an assembly step of installing parts on a vehicle body, for example. The post-step 60 is an inspection step on the vehicle 100, for example. The vehicle 100 having been delivered from the pre-step 50 becomes an item to be processed in the post-step 60 and runs along the track RT to the post-step 60 as a running destination. When permission of loading into the post-step 60 is given, the vehicle 100 is loaded into the post-step 60. After being subjected to the inspection step as the post-step 60, the vehicle 100 is finished as a product and runs to the standby place in the factory FC for waiting to be shipped. Then, the vehicle 100 is shipped to a destination country defined for each vehicle 100. The "destination country" means a country where a destination of shipment of the vehicle 100 manufactured in the factory FC exists. The pre-step 50 and the post-step 60 are not limited to the assembly step and the inspection step but various types of steps are adoptable on the assumption that the vehicle 100 after processed by the pre-step 50 and the post-step 60 is capable of running by remote control.

Each of steps in the factory FC including the pre-step 50 and the post-step 60 is equipped with a step control device for controlling manufacturing information about the vehicle 100. The "manufacturing information" includes a progress status of a process by the step, the number of in-process items, the number of products being processed, a manufacturing period in each step, start time and finish time of a process in each step, vehicle identification information about the vehicle 100 present in each step, a scheduled manufacture volume per day, and a target manufacturing period in a step for manufacturing one vehicle 100, for example. The target manufacturing period may also be called "takt time." The "vehicle identification information" means various types of information with which the vehicle 100 is individually identifiable. The vehicle identification information includes ID information given to each vehicle 100 such as a vehicle identification number (VIN), specification information about the vehicle 100 such as a vehicle type, a color, and a shape, and production control information about the vehicle 100 such as the name of a step in which the vehicle 100 is being processed, for example. The vehicle identification information may be acquired from a radio frequency-identification (RF-ID) tag given to the vehicle 100 through narrowband communication, for example. The step control device in each step acquires a manufacturing status about the vehicle 100 in each step from a camera or a sensor not shown in the drawings provided in each step, and transmits the acquired manufacturing status to a server 300. The manufacturing status in each step may be transmitted to a production control device that collectively controls manufacturing statuses in the steps in the factory FC.

The vehicle 100 includes a communication unit 190, a power receiver 150, a battery 120, a PCU 130, a motor 140, and an electronic control unit (ECU) 180. The communication unit 190 is a radio communication device such as a dongle, for example, mounted on the vehicle 100. A communication unit mounted on the vehicle 100 is also called a "vehicle communication unit." The communication unit 190 has a communication function of making communication using controller area network (CAN) communication used for control over the vehicle 100 and others, and using diagnosis communication available for diagnosis of failure, etc. The CAN communication is a communication standard allowing multidirectional transmission or reception. The diagnosis communication is a communication standard allowing request and response to be associated with each other on a one-to-one basis. The communication unit 190 makes radio communication via the access point 70 in the factory FC with devices outside the vehicle 100 such as the server 300 connected to a network 72 and the production control device not shown in the drawings for controlling production information about the vehicle 100 collectively.

The communication unit 190 receives a control signal for remote control over the vehicle 100 from the server 300.

The power receiver 150 converts alternating-current power supplied from an external power feeder, for example, to direct-current power using a rectifier, and supplies the direct-current power to the battery 120 as a load. The battery 120 is a chargeable secondary battery such as a lithium-ion battery or a nickel-hydrogen battery. The battery 120 is a high-voltage battery of several hundreds of volts, for example, and stores power to be used for running of the vehicle 100. When the battery 120 receives power supplied to the power receiver 150 from the external power feeder and regenerative power generated by the motor 140, the battery 120 is charged.

The motor 140 is an alternating-current synchronous motor, for example, and functions as an electric motor and a generator. When the motor 140 functions as the electric motor, the motor 140 is driven by the power stored in the battery 120 as a power source. Output from the motor 140 is transmitted through a decelerator and an axle to a wheel. During deceleration of the vehicle 100, the motor 140 functions as the generator using the rotation of the wheel to generate regenerative power. The power control unit (PCU) 130 is electrically connected between the motor 140 and the battery 120.

The PCU 130 has an inverter, a boost converter, and a DC/DC converter. The inverter converts direct-current power supplied from the battery 120 to alternating-current power, and supplies the converted alternating-current power to the motor 140. The inverter converts regenerative power supplied from the motor 140 to direct-current power, and supplies the direct-current power to the battery 120. The boost converter boosts a voltage at the battery 120 when the power stored in the battery 120 is supplied to the motor 140. The DC/DC converter steps down the voltage at the battery 120 when the power stored in the battery 120 is supplied to an auxiliary, for example.

The ECU 180 is mounted on the vehicle 100 and implements various types of control over the vehicle 100. The ECU 180 includes a hard disk drive (HDD), a solid state drive (SSD), an optical recording medium, a memory such as a semiconductor memory, a CPU as a central processing unit, and others. The CPU implements various computer programs stored in the memory to realize various functions of a driving controller 184 and others. The driving controller 184 implements driving control over the vehicle 100. The "driving control" is adjustment of an acceleration, a speed, and a rudder angle, for example. Under the driving control by remote control, the driving controller 184 controls each actuator mounted on the vehicle 100 in response to a control signal for the remote control received from the server 300 via the communication unit 190. Furthermore, the ECU 180 controls the PCU 130 to control transfer of power between the battery 120 and the motor 140.

The system 500 includes a vehicle detector and the server 300. The vehicle detector detects vehicle information including at least one of an image of the vehicle 100 and the location of the vehicle 100. The detected vehicle information is used for remote control by the system 500. The vehicle information may further include a running direction of the vehicle 100 or the position of the vehicle 100. A running direction of the vehicle 100 or the position of the vehicle 100 may be acquired by detecting the shape of the vehicle 100 or a part of the vehicle 100, for example. Only the location of the vehicle 100 may be detected by the vehicle detector, and a running direction or the position of the vehicle 100 may be estimated using temporal change in the vehicle 100.

In the present embodiment, a camera 80 is used as the vehicle detector. The camera 80 is connected to the server 300 in a manner communicable through radio communication or wire communication. The camera 80 has an imaging unit such as a charge coupled device (CCD) image sensor or a complementary metal oxide semiconductor (CMOS) image sensor, and an optical system. The camera 80 is fixed at a location allowing the camera 80 to capture images of the track RT and the vehicle 100 running along the track RT, and acquires an image of the vehicle 100 as the vehicle information. It is possible to acquire various types of vehicle information available for remote control such as the location of the vehicle 100 relative to the track RT and the position of the vehicle 100 by performing image analysis on the image acquired by the camera 80. Using the image from the camera 80 installed in the factory FC makes it possible to implement automatic running of the vehicle 100 by remote control without using a detector mounted on the vehicle 100 such as a camera, a millimeter wave radar, or light detection and ranging (LiDAR). Meanwhile, for a purpose such as prevention of collision during remote control, the detector mounted on the vehicle 100 may be used supplementarily. As long as the vehicle detector is capable of acquiring the location of the vehicle 100, the vehicle detector does not have to acquire an image of the vehicle 100. The vehicle detector to be used may be various types of detectors capable of detecting the location of the vehicle 100 such as LiDAR, an infrared sensor, a laser sensor, an ultrasonic sensor, and a millimeter wave radar, for example.

Figure 2:
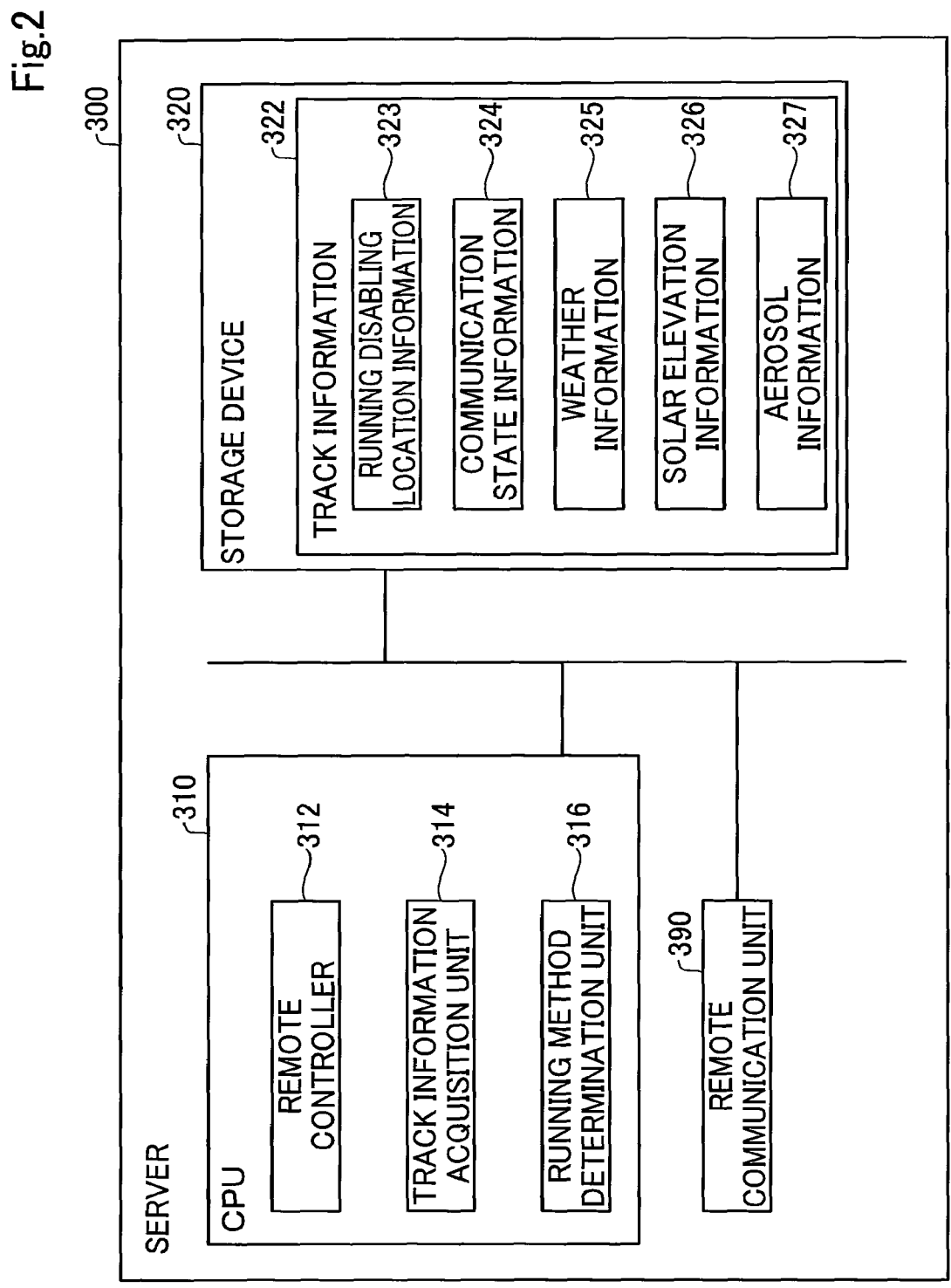
FIG. 2 is a block diagram showing an internal functional configuration of a server.

FIG. 2 is a block diagram showing an internal functional configuration of the server 300. The server 300 includes a CPU 310 as a central processing unit, a storage device 320, and a remote communication unit 390. These units are connected to each other via an internal bus or an interface circuit, for example. The remote communication unit 390 is a circuit for radio communication with the vehicle 100 and others via the network 72.

The storage device 320 is a RAM, a ROM, an HDD, or an SSD, for example. The storage device 320 stores various programs for realizing functions provided in the present embodiment. The CPU 310 executes a computer program stored in the storage device 320. This causes the CPU 310 to function as a remote controller 312, a track information acquisition unit 314, a running method determination unit 316, and others. Some or all the functions of these units may be configured by a hardware circuit.

The track information acquisition unit 314 acquires track information 322 from an external device or a certain database, for example. The running method determination unit 316 determines a running method of causing the vehicle 100 to run including a possibility or impossibility of running of the vehicle 100 and a running route along which the vehicle 100 is to run using the track information 322 acquired by the track information acquisition unit 314. The "running method of causing the vehicle 100 to run" may also be rephrased as a way of running of the vehicle 100 or running details of the vehicle 100. If it is determined from the track information 322 that there are places on the track RT disabling the vehicle 100 to run or if influence is assumed to be caused by a trouble during running of the vehicle 100 by remote control, for example, the running method determination unit 316 changes a running route of the vehicle 100 to a running route avoiding such locations. Furthermore, if the vehicle 100 is judged not to be capable of running safely along the track RT, the running method determination unit 316 determines to stop running of the vehicle 100.

The remote controller 312 implements automatic running of the vehicle 100 in the factory FC by remote control. More specifically, the remote controller 312 transmits a control signal requesting remote control to the vehicle 100 via the remote communication unit 390. When the vehicle 100 accepts the request for remote control, the ECU 180 realizes driving control responsive to the control signal. As a result, the vehicle 100 runs automatically. By transporting the vehicle 100 using automatic running by remote control, it becomes possible to reduce or prevent human-induced accidents during transport of the vehicle 100.

Figure 3A:
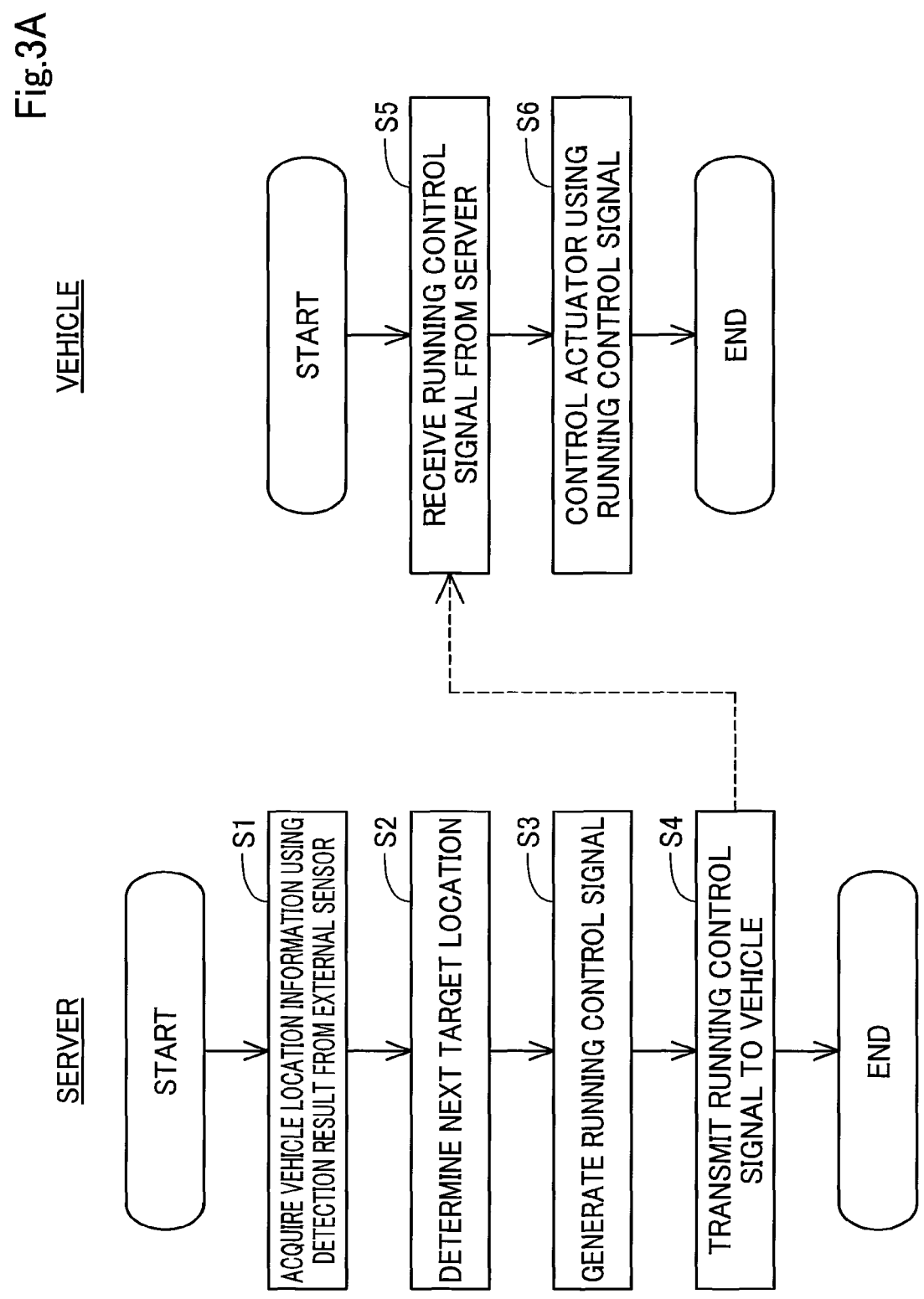
FIG. 3A is a flowchart showing a procedure of running control over a vehicle according to the first embodiment.

FIG. 3A is a flowchart showing a processing procedure for running control of the vehicle 100 in the first embodiment. In step S1, the server 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is a camera 80 that is disposed in the factory and outputs a captured image as detection result. In step S1, the server 300 acquires the vehicle location information using the captured image acquired from the camera 80 as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the system 500 or outside the system 500. The detection model is stored in advance in a memory of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The memory of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 300 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquisition of vehicle location information, the determination of a target location, the generation of a running control signal, the transmission of the running control signal, and others in a predetermined cycle.

In step S5, the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the system 500 in the present embodiment, it becomes possible to move the vehicle 100 without using a transport unit such as a crane or a conveyor.

Figure 3B:
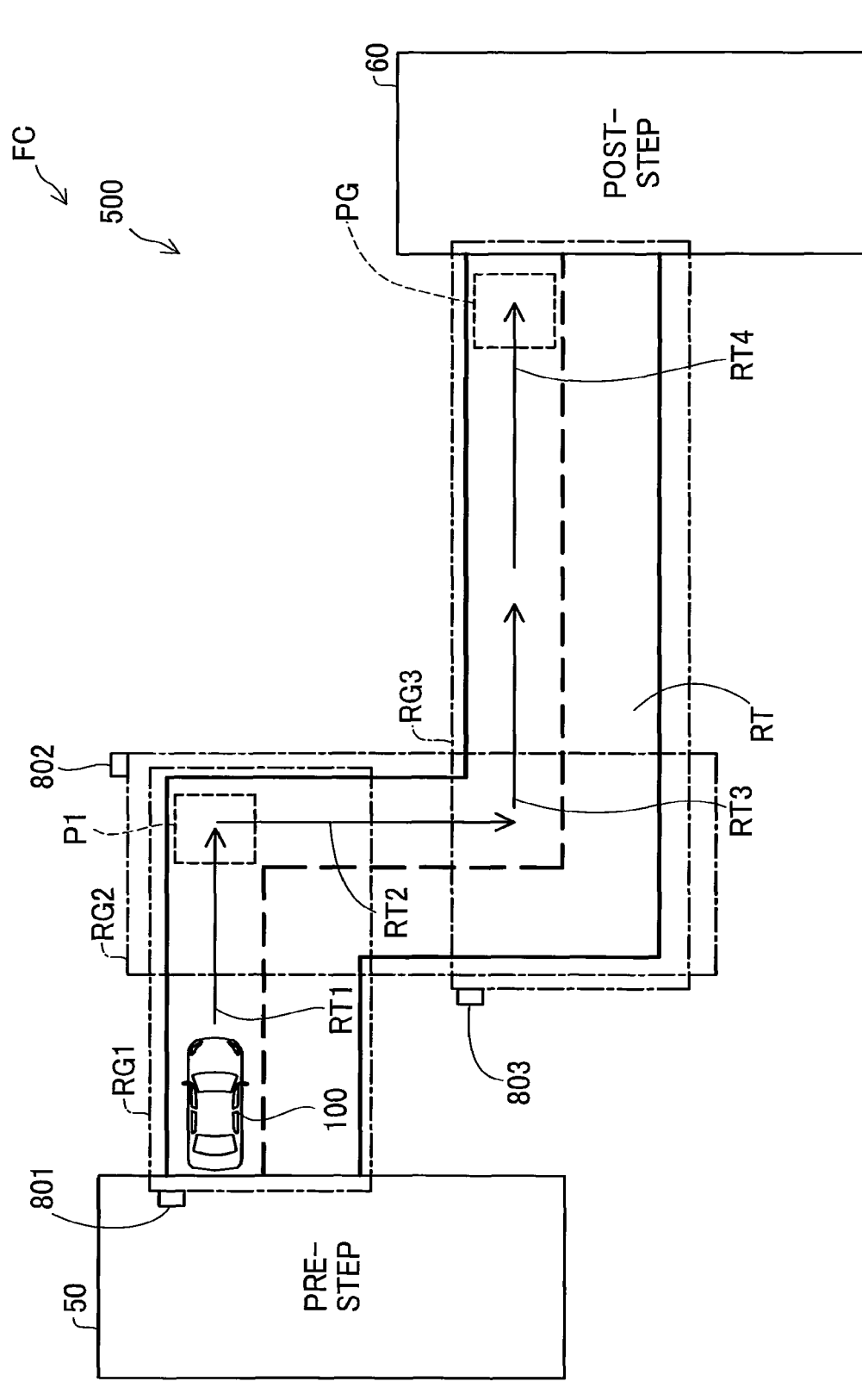
FIG. 3B is an explanatory view showing automatic driving control over the vehicle by remote control by a remote controller.

FIG. 3B is an explanatory view showing automatic driving control over the vehicle 100 by remote control by the remote controller 312. In the illustration in FIG. 3B, the track RT includes a track RT1, a track RT2, a track RT3, and a track RT4 continuous with each other. The track RT1 and the track RT2 are connected to each other across a right-angled curve. In normal time, the remote controller 312 causes the vehicle 100 to run along the track RT to a loading location PG for loading into the post-step 60. In the illustration in FIG. 3B, the track RT has two lanes. Meanwhile, the number of lanes of the track RT may be one, or any number of equal to or greater than 3.

As shown in FIG. 3B, the camera 80 as the vehicle detector acquires images of the vehicle 100 on the track RT viewed from above. The number of the cameras 80 is set by giving consideration to angles of view of the cameras 80, etc. to a number allowing imaging of the track RT entirely.

In the illustration in FIG. 3B, the camera 80 includes a camera 801 allowing imaging of a range RG1 covering the track RT1 entirely, a camera 802 allowing imaging of a range RG2 covering the track RT2 entirely, and a camera 803 allowing imaging of a range RG3 covering the track RT3 and the track RT4 entirely. The camera 80 may acquire not only an image captured from above the vehicle 100 but also an image captured from the front, back, or side of the vehicle 100, for example. Cameras for acquiring such images may be used freely in combination.

The track RT has a target route set in advance as a route along which the vehicle 100 is to run under remote control. In the present embodiment, the target route corresponds to the above-described reference route. The remote controller 312 acquires images of the track RT and the vehicle 100 provided by the camera 80 through radio communication with the vehicle 100 via the access point 70. The remote controller 312 causes the ECU 180 to implement driving control over the vehicle 100 while analyzing the acquired images at a predetermined time interval. If the remote controller 312 makes a request for remote control to the vehicle 100, the remote controller 312 sequentially adjusts the location of the vehicle 100 relative to the target route, thereby allowing the vehicle 100 to run along the target route. For the remote control, an image of the entire vehicle 100 may be used or an image of a part of the vehicle 100 such as an alignment mark given to the vehicle 100 may be used.

The cameras 80 are configured in such a manner that, at a connecting location of each track such as a location P1 shown in FIG. 3B, the angles of view of the cameras 80 corresponding to the respective connected tracks overlap each other. In the example of the location P1, the angle of view of the camera 801 corresponding to the track RT1 and the angle of view of the camera 802 corresponding to the track RT2 overlap each other. The vehicle 100 having been delivered from the pre-step 50 runs to the location P1 by remote control using an image captured by the camera 801. When the vehicle 100 arrives at the location P1, switch is made to remote control using a captured image acquired by the camera 802 instead of the camera 801 and the vehicle 100 runs along the track RT2. Likewise, an image captured by the camera 803 is used for running along the track RT3 and the track RT4. In this way, the remote controller 312 implements remote control over the vehicle 100 while switching a captured image to be analyzed properly on the basis of the range of the track RT.

Referring back to FIG. 2, the storage device 320 has a readable and writable area where the track information 322 is stored. The track information 322 includes various types of data about an environment of the track RT enabling the vehicle 100 to run. The "data about an environment of the track RT" means various types of data about the environment of the track RT likely to influence running of the vehicle 100 such as the appropriateness of running of the vehicle 100 by remote control, a state of recognition of the location or position of the vehicle 100 on the track RT, accuracy in detection of the location or position, etc. The track information 322 includes running disabling location information 323, communication state information 324, weather information 325, solar elevation information 326, and aerosol information 327.

The running disabling location information 323 is information about a location in which the vehicle 100 cannot run on the track RT. In the present embodiment, the running disabling location information 323 includes information about construction carried out on the track RT, and information about a stopped vehicle on the track RT. The "information about construction carried out on the track RT" includes scheduled date and time of the construction, a location of the construction on the track RT and others, for example. The information about the construction is input to a factory information control device for controlling information about the factory by a worker or a business operator to carry out the construction or by an administrator for management of such a worker or a business operator, for example. Result of the input is acquired by the server 300. The "stopped vehicle on the track RT" includes a vehicle scheduled to be stopped on the track RT for the purpose of construction, etc., and a vehicle emergently stopped for reason such as failure, for example. The stopped vehicle on the track RT may be detected by causing the server 300 to acquire information input in advance by the worker or the business operator to carry out the construction, or the vehicle 100 stopped on the track RT may be detected by the camera 80, for example. The running disabling location information 323 may include only one of information about construction to be carried out on the track RT and information about a stopped vehicle on the track RT, or may include information other than information about construction to be carried out on the track RT and information about a stopped vehicle on the track RT such as location information about a foreign matter detected on the track RT.

The communication state information 324 is information about a communication state of radio communication for implementing driving control over the vehicle 100 by remote control. More specifically, the communication state information 324 is information about a communication state of radio communication between the communication unit 190 of the vehicle 100 when the vehicle 100 runs along the track RT or stops on the track RT, and the access point 70. In the present embodiment, a state of communication between the communication unit 190 and the access point 70 includes radio field strength at the access point 70 to which the communication unit 190 is connected, and channel utilization at the access point 70. If the communication state of the radio communication is out of order, transmission and receipt of a control signal for remote control becomes unsuccessful, causing a probability of failing to implement driving control over the vehicle 100 properly. The channel utilization at the access point 70 is determined by causing the server 300 to acquire an output value from the access point 70, for example. The communication state may be only one of radio field strength at the access point 70 and channel utilization at the access point 70. The communication state may include a speed of communication between the communication unit 190 and the access point 70 or a heat map of the radio field strength in addition to the radio field strength and the channel utilization.

The weather information 325 is information about weather at the track RT. More specifically, the weather information 325 includes a sunshine duration at the track RT and a temperature at the track RT. The weather information 325 may be acquired from a weather forecast made public by an external agency such as the Meteorological Agency, for example. In a sunshine duration at the track RT, sunlight easily enters the imaging unit of the camera 80. Excessive entry of sunlight into the imaging unit of the camera 80 may make it impossible to detect the vehicle 100 property during image processing on a captured image due to so-called overexposure, for example. If a temperature at the track RT is low, a road surface of the track RT may freeze to make the vehicle 100 easy to skid. This may reduce accuracy in controlling the location of running of the vehicle 100 during driving control over the vehicle 100 by remote control or may make it difficult to implement the driving control. The weather information 325 may be only one of a sunshine duration and a temperature. In addition to a sunshine duration and a temperature, the weather information 325 may include information about rainfall, snowfall, a wind direction, wind force, global solar irradiation, a typhoon, or a twister, for example, other than a sunshine duration and a temperature.

The solar elevation information 326 is information about solar elevation at the track RT. The "solar elevation" means an angle to the sun measured with a direction of the horizon defined at an angle of zero degrees and the zenith defined at an angle of 90 degrees. Solar elevation is determined by acquiring a nominal value from an external agency such as the National Astronomical Observatory of Japan (NAOJ) or the Meteorological Agency, for example. The "information about solar elevation at the track RT" is used for estimating an angle of light entering the camera 80.

The aerosol information 327 is information about aerosol in the air. The "aerosol" means solid or liquid particles floating in the air. In the present embodiment, the aerosol information 327 includes a type of aerosol and an amount of the aerosol. The type of aerosol and the amount of the aerosol are determined by acquiring nominal values from an external agency such as the Meteorological Agency, for example. The type of aerosol and the amount of the aerosol are information about a quantity of light entering the camera 80. With the large amount of aerosol or depending on the type of generated aerosol, for example, a field of view of the camera 80 may be interrupted to reduce the quantity of light entering the camera 80, making it impossible to acquire an image of the vehicle 100 properly. The type of aerosol includes liquid aerosol such as fog and mist, and solid aerosol such as smoke and dust. The type of aerosol further includes mineral particles such as yellow sand, viable particles such as pollen, soot released as a result of combustion of fossil fuel or biomass fuel, and others. The aerosol information 327 may be only one of the type of aerosol and the amount of the aerosol.

Figure 4:
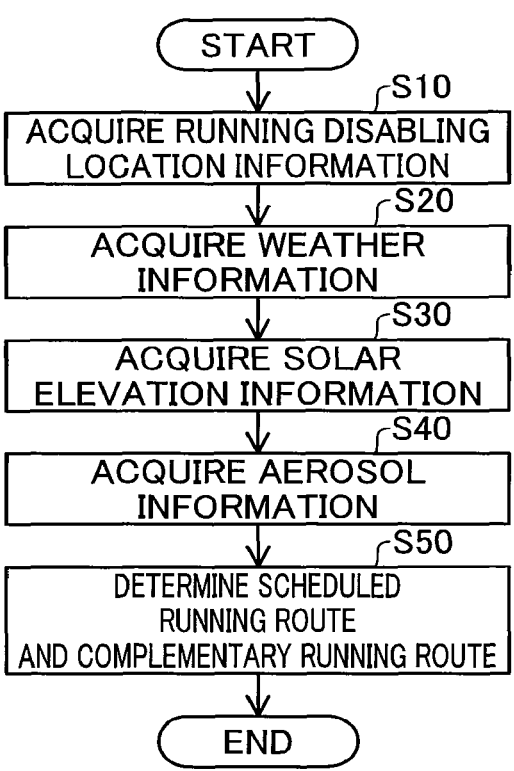
FIG. 4 is a flowchart showing a processing routine of a scheduled running route determination process.

FIG. 4 is a flowchart showing a processing routine of a scheduled running route determination process performed by the system 500 of the present embodiment. A "scheduled running route" is a route determined in advance before the vehicle 100 runs, the route being along the track RT. In the present embodiment, the scheduled running route may also be called a "first track". The process described as an example in the present embodiment is to determine a running route along which the vehicle 100 is to run by remote control along the track RT from the pre-step 50 to the post-step 60.

This flow is started by the running method determination unit 316 having detected using manufacturing information acquired from the step control device, for example, that the vehicle 100 is to run along the track RT. Preferably, this flow is implemented with timing before timing of vehicle 100 running along the track RT such as timing one day before a day when the vehicle 100 having predetermined vehicle identification information is to be subjected to the process in the pre-step 50, for example.

In step S10, the track information acquisition unit 314 acquires the running disabling location information 323. The track information acquisition unit 314 acquires running disabling location information stored in the factory information control device in the factory FC and stores the acquired running disabling location information into the storage device 320 of the server 300. As a result, the track information acquisition unit 314 acquires information about construction to be carried out on the track RT in a time period when the vehicle 100 is schedule to run and information about the vehicle 100 to be stopped on the track RT in this time period.

In step S20, the track information acquisition unit 314 acquires the weather information 325. The track information acquisition unit 314 acquires a weather forecast corresponding to a location of the track RT from weather forecasts made public by the Meteorological Agency, for example. The acquired weather information is stored as the weather information 325 into the storage device 320. As a result, the track information acquisition unit 314 acquires a temperature at the track RT and a sunshine duration at the track RT in the time period when the vehicle 100 is scheduled to run.

In step S30, the track information acquisition unit 314 acquires the solar elevation information 326. More specifically, the track information acquisition unit 314 acquires a nominal value about solar elevation made public by the National Astronomical Observatory of Japan, for example. As a result, the track information acquisition unit 314 acquires solar elevation in the time period when the vehicle 100 is scheduled to run.

In step S40, the track information acquisition unit 314 acquires the aerosol information 327. More specifically, the track information acquisition unit 314 acquires the type of aerosol assumed to be generated at the location of the track RT and the amount of the aerosol made public by the Meteorological Agency, for example. As a result, the track information acquisition unit 314 acquires the type of the aerosol and the amount of the aerosol in the time period when the vehicle 100 is scheduled to run.

In step S50, the running method determination unit 316 determines a scheduled running route along which the vehicle 100 is to run using the running disabling location information 323, the weather information 325, the solar elevation information 326, and the aerosol information 327 acquired as the track information 322. Using the track information 322, the running method determination unit 316 extracts a place where the vehicle 100 is judged to be unable to run and a place where accuracy of recognition of the vehicle 100 may be reduced from a standard running route set in advance along the track RT, for example. By referring to result of the extraction and using a publicly-known route generation algorithm, for example, the running method determination unit 316 determines a scheduled running route. The scheduled running route causes the vehicle 100 to run along a route where accuracy of recognition of the vehicle 100 is unlikely to be reduced while causing the vehicle 100 to avoid or bypass the place on the track RT disabling running. In the present embodiment, the running method determination unit 316 determines a running route of the lowest probability of reduction in the accuracy of recognition of the vehicle 100 to be the scheduled running route, and determines a running route of higher probability of such reduction than the scheduled running route to be a complementary running route. The complementary running route is a running route changeable from the scheduled running route if running along the scheduled running route is judged to be inappropriate in a running route determination process described later. In the present specification, the complementary running route is also called a "second track".

Figure 5:
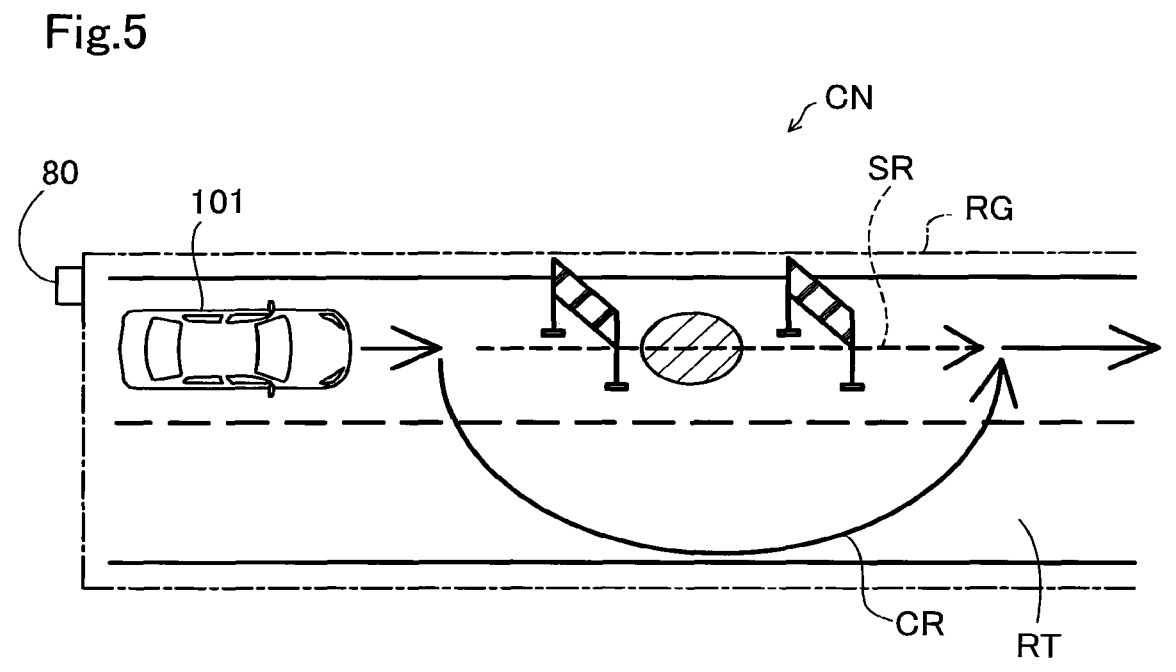
Figure 6:
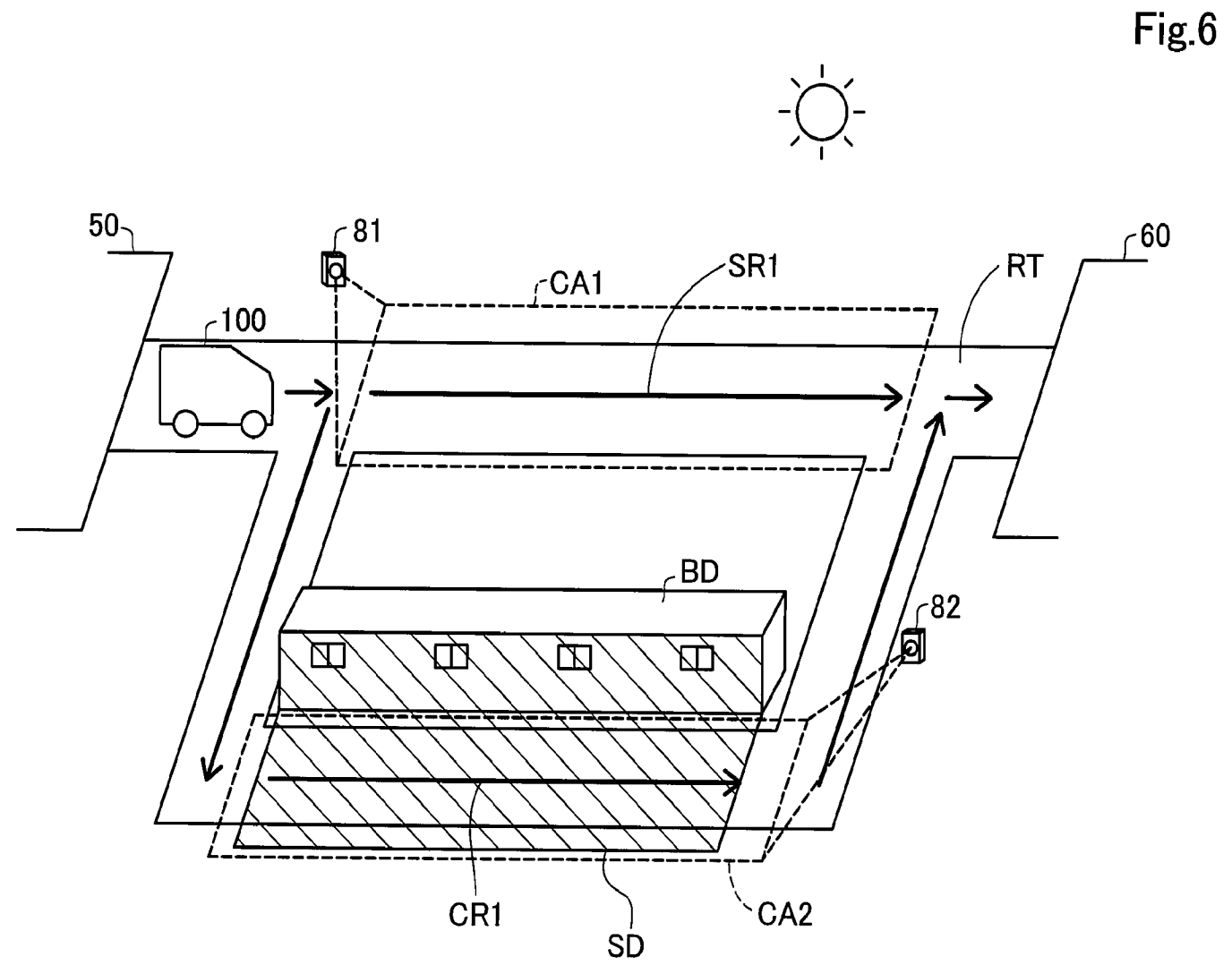

FIG. 5 is a first explanatory view showing an example of change in a running route by the running method determination unit 316 using the track information 322. FIG. 5 shows a location of implementation of construction CN on the track RT illustrated as an example of the running disabling location information 323. The running method determination unit 316 refers to the running disabling location information 323 to acquire the location of implementation of the construction CN, and extracts the acquired location as a place disabling running from a standard running route SR. In order to avoid the location of implementation of the construction CN disabling running, the running method determination unit 316 changes the standard running route SR to a running route CR, and determines the changed running route CR to be a scheduled running route. Specifically, in the example in FIG. 6, the running method determination unit 316 modifies the standard running route SR, which is set on the track RT in advance, on the same track RT to avoid the location of implementation of the construction CN using the track information 322. In FIG. 6, the standard running route SR and the changed running route CR are on the same track RT.

FIG. 6 is a second explanatory view showing an example of change in a running route by the running method determination unit 316 using the track information 322. In FIG. 6, the running method determination unit 316 changes a running route by referring a sunshine duration at the track RT as an example of the weather information 325.

In the illustration in FIG. 6, the track RT between the pre-step 50 and the post-step 60 includes a standard running route SR1 and a bypass route CR1 connected to the running route SR1. Self-running conveyance is implemented along the standard running route SR1 using an image of the vehicle 100 in a range CA1 acquired by a camera 81 as an example of the camera 80. Self-running conveyance is implemented along the bypass route CR1 using an image of the vehicle 100 in a range CA2 acquired by a camera 82 as an example of the camera 80. In the illustration in FIG. 6, in the captured image of the range CA1 acquired by the camera 81, as a result of entry of a lot of sunlight into an imaging unit of the camera 81 during a sunshine duration, accuracy of recognition of the vehicle 100 is reduced. The range CA2 captured by the camera 82 is covered with a shade SD of a building BD during the sunshine duration. Thus, in the range CA2, sunlight is difficult to enter the camera 82. As a result, in the captured image of the range CA2, accuracy of recognition of the vehicle 100 is higher than that in the case using the captured image of the range CA1.

The running method determination unit 316 refers to the sunshine duration at the track RT as the weather information 325, and sets a scheduled running route of the vehicle 100 scheduled to run along the track RT during the sunshine duration to the bypass route CR1 of low probability of reduction in the accuracy of recognition of the vehicle 100. In the present embodiment, the camera 81 that acquires an image of the vehicle 100 running along the scheduled running route as the first track is also called a first camera 81, and the camera 82 that acquires an image of the vehicle 100 running along the complementary running route as the second track is also called a second camera 82. If the running method determination unit 316 sets a running route to the first track SR2, a state of recognition of the vehicle 100 in an image of the vehicle 100 acquired by the first camera 81 is better than a state of recognition of the vehicle 100 in an image of the vehicle 100 acquired by the second camera 82. If the running method determination unit 316 sets a running route to the first track SR2, the quantity of light entering the first camera 81 is larger than the quantity of light entering the second camera 82. In the illustration in FIG. 6, in a time period other than the sunshine duration, there is no superiority or inferiority in accuracy of recognition of the vehicle 100 between the standard running route SR1 and the bypass route CR1. In this case, the running method determination unit 316 determines the standard running route SR1 to be a scheduled running route.

Figure 7:
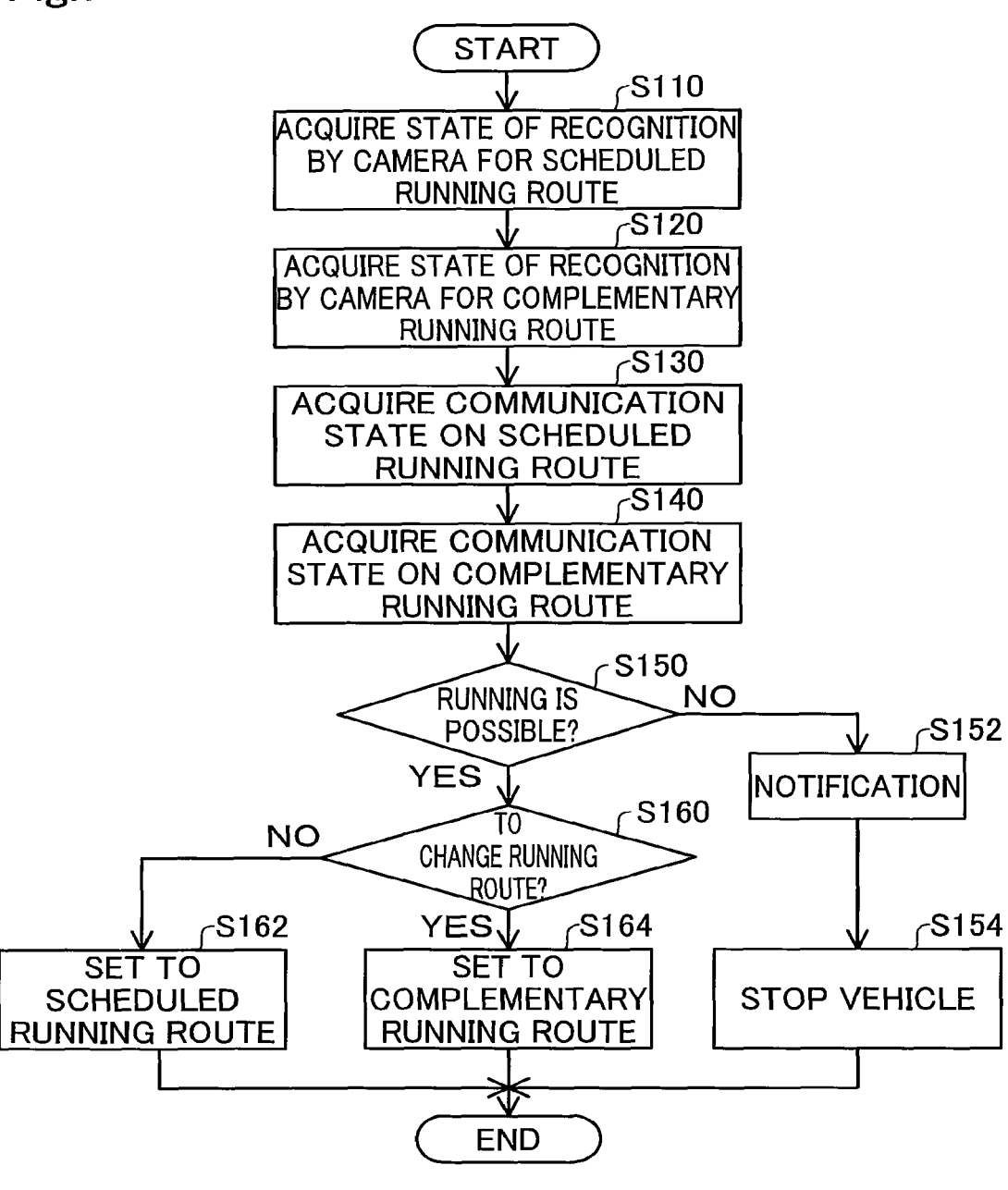
FIG. 7 is a flowchart showing a processing routine of a running route determination process.

FIG. 7 is a flowchart showing a processing routine of the running route determination process performed by the system 500 of the present embodiment. This flow is implemented when the vehicle 100 starts to run along the track RT. More specifically, this flow is started by the track information acquisition unit 314 having detected completion of the process in the pre-step 50 or completion of preparation for running of the vehicle 100 from the pre-step 50, for example.

In step S110, the track information acquisition unit 314 acquires a state of recognition by the camera 80 corresponding to the scheduled running route determined in step S50. For example, the track information acquisition unit 314 acquires a captured image obtained by causing the camera 80 to capture an image of a target for identifying a state of recognition by the camera 80. The track information acquisition unit 314 makes image analysis on the target in the acquired image to evaluate a state of recognition of the target in the captured image.

A state of recognition of the target may be evaluated by a method using a probability that is calculated using an object recognition algorithm employing machine learning, for example. For the object recognition, machine learning models are available that use various types of neural networks such as a convolutional neural network (CNN), a recurrent neural network (RNN), a generative adversarial network (GAN), and variational autoencoder (VAE), for example. The above-described detection model is applicable to such a machine learning model. The image acquired from the camera 80 is input to a learned machine learning model to make the machine learning model recognize the target in the captured image as an object, thereby acquiring a probability of match with a target in a supervised image. If the acquired probability is lower than a predetermined threshold, it is possible to evaluate the recognition state as being low. If the acquired probability is lower than the predetermined threshold at any place on the scheduled running route, the running method determination unit 316 judges that the state of recognition by the camera 80 is bad and judges the scheduled running route to be a running disabling route.

In step S120, the track information acquisition unit 314 acquires a state of recognition by the camera 80 corresponding to the complementary running route determined in step S50. More specifically, the track information acquisition unit 314 acquires a captured image by causing the camera 80 to capture an image of a target for identifying a state of recognition by the camera 80. The track information acquisition unit 314 evaluates a state of recognition of the target through analysis on the acquired image of the target in the same way as in step S110.

Figure 8:
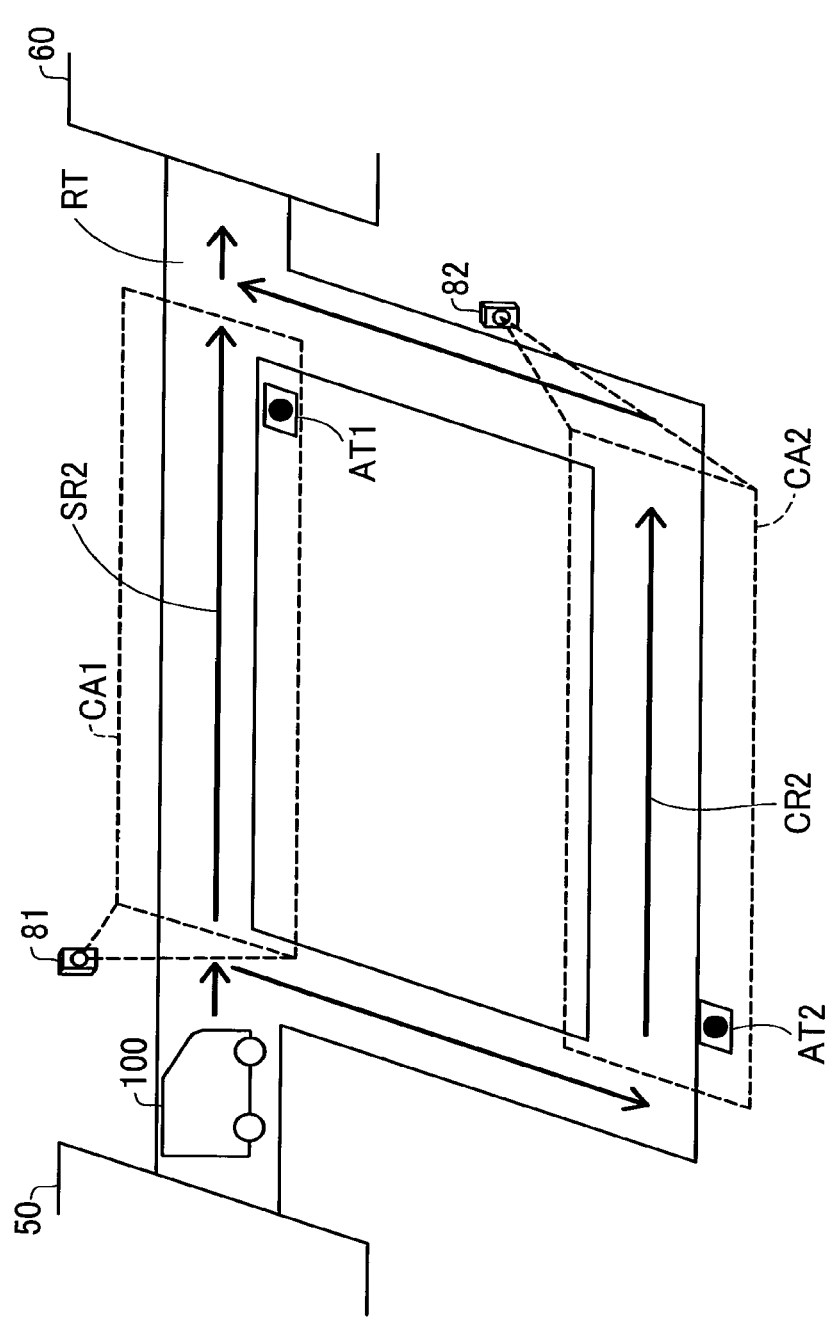
FIG. 8 is an explanatory view showing a method of acquiring a state of recognition by a first camera corresponding to a first track and a state of recognition by a second camera corresponding to a second track.

FIG. 8 is an explanatory view showing a method of acquiring a state of recognition by the first camera corresponding to the first track and a state of recognition by the second camera corresponding to the second track. FIG. 8 shows the first camera 81 corresponding to a first track SR2 as a scheduled running route, and the second camera 82 corresponding to a second track CR2 as a complementary running route. The range CA1 capable of being subjected to imaging by the first camera 81 covers an evaluation mark AT1 provided for evaluation of a state of recognition by the first camera 81. The range CA2 capable of being subjected to imaging by the second camera 82 covers an evaluation mark AT2 provided for evaluation of a state of recognition by the second camera 82. Each of the illustrated evaluation mark AT1 and evaluation mark AT2 is a predetermined pattern allowing evaluation of a state of recognition by the camera 80 through object recognition using a machine learning model.

The track information acquisition unit 314 acquires a captured image of the evaluation mark AT1 from the first camera 81 and acquires a captured image of the evaluation mark AT2 from the second camera 82. The track information acquisition unit 314 inputs the acquired image of each of the evaluation marks AT1 and AT2 to the machine learning model, and acquires a probability as an output value from the machine learning model. If the acquired probability is lower than a predetermined threshold, for example, the running method determination unit 316 judges that the corresponding running route is a running disabling route.

Referring back to FIG. 7, in step S130, the track information acquisition unit 314 acquires information about a communication state of radio communication between the communication unit 190 of the vehicle 100 on the scheduled running route and the access point 70. In the present embodiment, the track information acquisition unit 314 acquires channel utilization output from the access point 70 that makes radio communication with the communication unit 190 of the vehicle 100 running along the scheduled running route. If the acquired channel utilization is lower than a predetermined threshold, it is possible to evaluate the communication state as being low. This threshold is settable using such a value as will cause disorder in driving control over the vehicle 100 by remote control by the remote controller 312, for example. In the present embodiment, if it is determined that a communication state of the access point 70 is low at any place on the scheduled running route, the running method determination unit 316 judges that the scheduled running route is a running disabling route.

In step S140, the track information acquisition unit 314 acquires a state of recognition by the camera 80 corresponding to the complementary running route. More specifically, the track information acquisition unit 314 acquires information about a communication state of radio communication between the communication unit 190 of the vehicle 100 on the complementary running route and the access point 70. The track information acquisition unit 314 acquires channel utilization output from the access point 70 corresponding to the complementary running route. The track information acquisition unit 314 evaluates a state of communication of the radio communication using the acquired channel utilization in the same way as in step S130.

Figure 9:
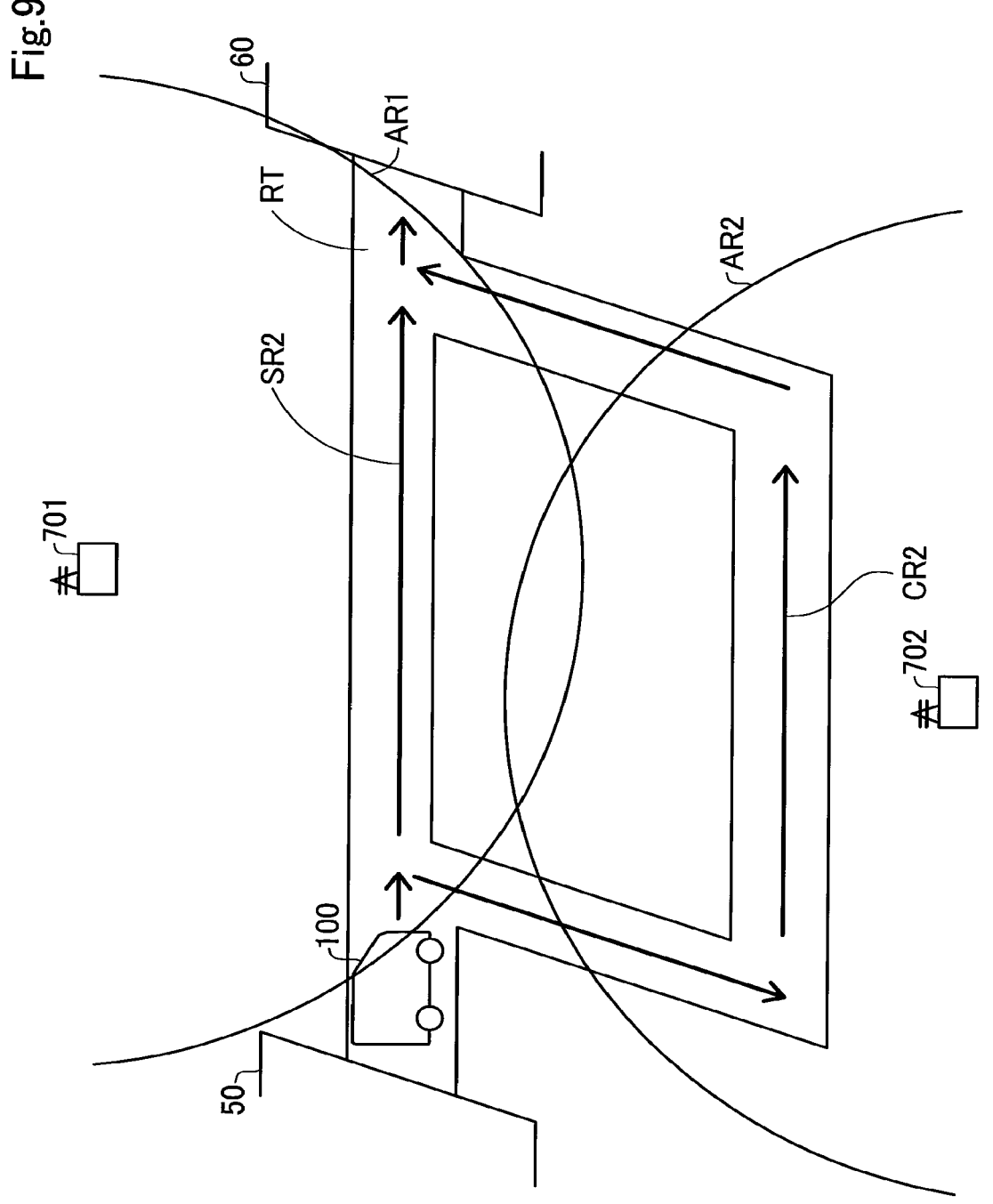
FIG. 9 is an explanatory view showing a method of acquiring a communication state of an access point corresponding to the first track and a communication state of an access point corresponding to the second track.

FIG. 9 is an explanatory view showing a method of acquiring a communication state of an access point 701 corresponding to the first track SR2 and a communication state of an access point 702 corresponding to the second track CR2. As shown in FIG. 9, a communication range AR1 of the access point 701 covers the first track SR2 as a scheduled running route, and a communication range AR2 of the access point 702 covers the second track CR2 as a complementary running route. The track information acquisition unit 314 acquires channel utilization at the first track SR2 from the access point 701 and channel utilization at the second track CR2 from the access point 702.

As shown in FIG. 7, in step S150, the running method determination unit 316 determines whether the scheduled running route and the complementary running route are running enabling routes. More specifically, the running method determination unit 316 determines whether the scheduled running route and the complementary running route are running enabling routes on the basis of evaluation results about the states of recognition by the cameras and the communication states obtained in steps from step S110 to step S140. If both the scheduled running route and the complementary running route are judged to be running disabling routes (S150: NO), the running method determination unit 316 moves the process to step S152. The case in which both the scheduled running route and the complementary running route are running disabling routes is at least one of a case in which a state of recognition of the vehicle 100 is bad on both the scheduled running route and the complementary running route and a case in which a communication state is bad on both the scheduled running route and the complementary running route.

In step S152, the running method determination unit 316 makes notification that running of the vehicle 100 is impossible. The notification may be made to a worker at the pre-step 50 or the post-step 60 or to an administrator, for example. The notification may be made through indication on a display of a control device in each step or through voice, etc. from a speaker mounted on the vehicle 100, for example. In step S154, the remote controller 312 stops the vehicle 100 and finishes the process. The remote controller 312 may cause the vehicle 100 to run to a predetermined standby location.

In step S150, if at least one of the scheduled running route and the complementary running route is determined to be a running enabling route (S150: YES), the running method determination unit 316 moves the process to step S160. In step S160, the running method determination unit 316 determines whether to change a running route from the scheduled running route, namely, whether to change the scheduled running route to the complementary running route by referring to the results acquired in steps from step S110 to step S140. The change to the complementary running route is made if the recognition state of the vehicle 100 on the scheduled running route and the communication state on the scheduled running route are worse than corresponding states on the complementary running route, for example.

If a running route is not to be changed (S160: NO), the running method determination unit 316 moves the process to step S162. In step S162, the running method determination unit 316 sets a running route to the scheduled running route and then finishes the process. If a running route is to be changed (S160: YES), the running method determination unit 316 moves the process to step S164. In step S164, the running method determination unit 316 sets a running route to the complementary running route and then finishes the process.

As described above, the system 500 of the present embodiment includes: the track information acquisition unit 314 that acquires the track information 322 about an environment of the track RT enabling the vehicle 100 to run by remote control; and the running method determination unit 316 that determines a running method including at least one of the possibility or impossibility of running of the vehicle 100 and change in the running route SR along which the vehicle 100 is to run using the acquired track information 322. Thus, by determining a running method using the track information 322, it becomes possible to determine an appropriate running method of causing the vehicle 100 to run responsive to the state of the track RT.

The system 500 of the present embodiment further includes the access point 70 as a radio communication unit for making radio communication with the communication unit 190. The track information 322 includes a state of communication between the communication unit 190 on the track RT and the access point 70. Thus, it is possible to determine an appropriate running method of causing the vehicle 100 to run responsive to a communication state for remote control.

In the system 500 of the present embodiment, the state of communication between the communication unit 190 and the access point 70 is radio field strength at the access point 70 and channel utilization at the access point 70. Thus, it is possible to determine an appropriate running method of causing the vehicle 100 to run responsive to the radio field strength and the channel utilization at the access point 70.

In the system 500 of the present embodiment, the track information 322 includes the weather information 325 at the track RT including a sunshine duration at the track RT and a temperature at the track RT. Thus, it is possible to determine an appropriate running method of causing the vehicle 100 to run responsive to the sunshine duration and the temperature.

In the system 500 of the present embodiment, the track information 322 includes information about a running disabling location including at least one of information about the construction CN carried out on the track RT and information about a stopped vehicle on the track RT. Thus, it is possible to determine an appropriate running method of causing the vehicle 100 to run allowing the vehicle 100 to avoid locations disabling running such as the construction CN carried out on the track RT and the stopped vehicle on the track RT.

The system 500 of the present embodiment further includes the camera 80 capable of acquiring an image of the vehicle 100, the image being used for remote control. The track information 322 is acquired using an image captured by the camera 80. Thus, by using the image captured by the camera 80 used for the remote control as the track information 322, it becomes possible to determine an appropriate running method of causing the vehicle 100 to run responsive to the captured image used for the remote control.

In the system 500 of the present embodiment, the track information 322 includes information indicating states of recognition of the evaluation marks AT1 and AT2 in images of the evaluation marks AT1 and AT2 respectively acquired by the cameras 80. Thus, it is possible to determine an appropriate running method of causing the vehicle 100 to run according to the recognition state in the image captured by the camera 80 used for remote control.

In the system 500 of the present embodiment, the running method determination unit 316 evaluates the state of recognition of the vehicle 100 by the camera 80 using information about the angle of light entering the camera 80 and information about the quantity of the light, and determines a running method of causing the vehicle 100 to run using result of the evaluation. By determining a running method using the angle of light and the quantity of the light entering the camera 80, it becomes possible to determine an appropriate running method of causing the vehicle 100 to run, the method reducing the occurrence of a trouble in image analysis such as so-called overexposure.

In the system 500 of the present embodiment, the track information acquisition unit acquires a nominal value about solar elevation given from an external agency, and the running method determination unit 316 evaluates the state of recognition of the vehicle 100 using the nominal value about the solar elevation as the information about the angle of the light entering the camera 80. It is possible to determine an appropriate running method of causing the vehicle 100 to run, the method reducing the occurrence of a trouble in image analysis through the simple way using the nominal value about solar elevation.

In the system 500 of the present embodiment, the running method determination unit 316 evaluates the state of recognition of the vehicle 100 using the type of aerosol in the air and the amount of the aerosol as the information about the quantity of the light entering the camera 80. This allows the state of recognition of the vehicle 100 by the camera 80 to be judged using the information about the aerosol. Thus, it is possible to evaluate the state of recognition of the vehicle 100 by the camera 80 through the simple way omitting process such as image analysis on the captured image.

In the system 500 of the present embodiment, the track information acquisition unit acquires a nominal value about at least one of the type of the aerosol and the amount of the aerosol given from an external agency such as the Meteorological Agency. The running method determination unit 316 evaluates the state of recognition of the vehicle 100 using the nominal value. This allows acquisition of information about the aerosol through the simple way of acquiring the nominal value, making it possible to judge the state of recognition of the vehicle 100 through the simple way.

If the system 500 of the present embodiment includes the first camera 81 capable of acquiring an image of the vehicle 100 on the first track SR2 and the second camera 82 capable of acquiring an image of the vehicle 100 on the second track CR2, and if the running method determination unit 316 sets the running route to the first track SR2, a state of recognition of the vehicle 100 in an image of the vehicle 100 acquired by the first camera 81 is better than a state of recognition of the vehicle 100 in an image of the vehicle 100 acquired by the second camera 82. Thus, it is possible to cause the vehicle 100 to run along a running route providing a favorable recognition state.

In the system 500 of the present embodiment, if the running method determination unit 316 sets the running route SR to the first track SR2, the quantity of light entering the second camera 82 is larger than the quantity of light entering the first camera 81. Thus, it is possible to cause the vehicle 100 to run along a running track that reduces the occurrence of a trouble in image analysis such as overexposure.

In the system 500 of the present embodiment, if a state of recognition of the vehicle 100 is bad on both the first track SR2 and the second track CR2, the running method determination unit 316 determines to stop running of the vehicle 100. Thus, it is possible to prevent the vehicle 100 from running while driving control by remote control is unstable.

B. Second Embodiment

Figure 10:
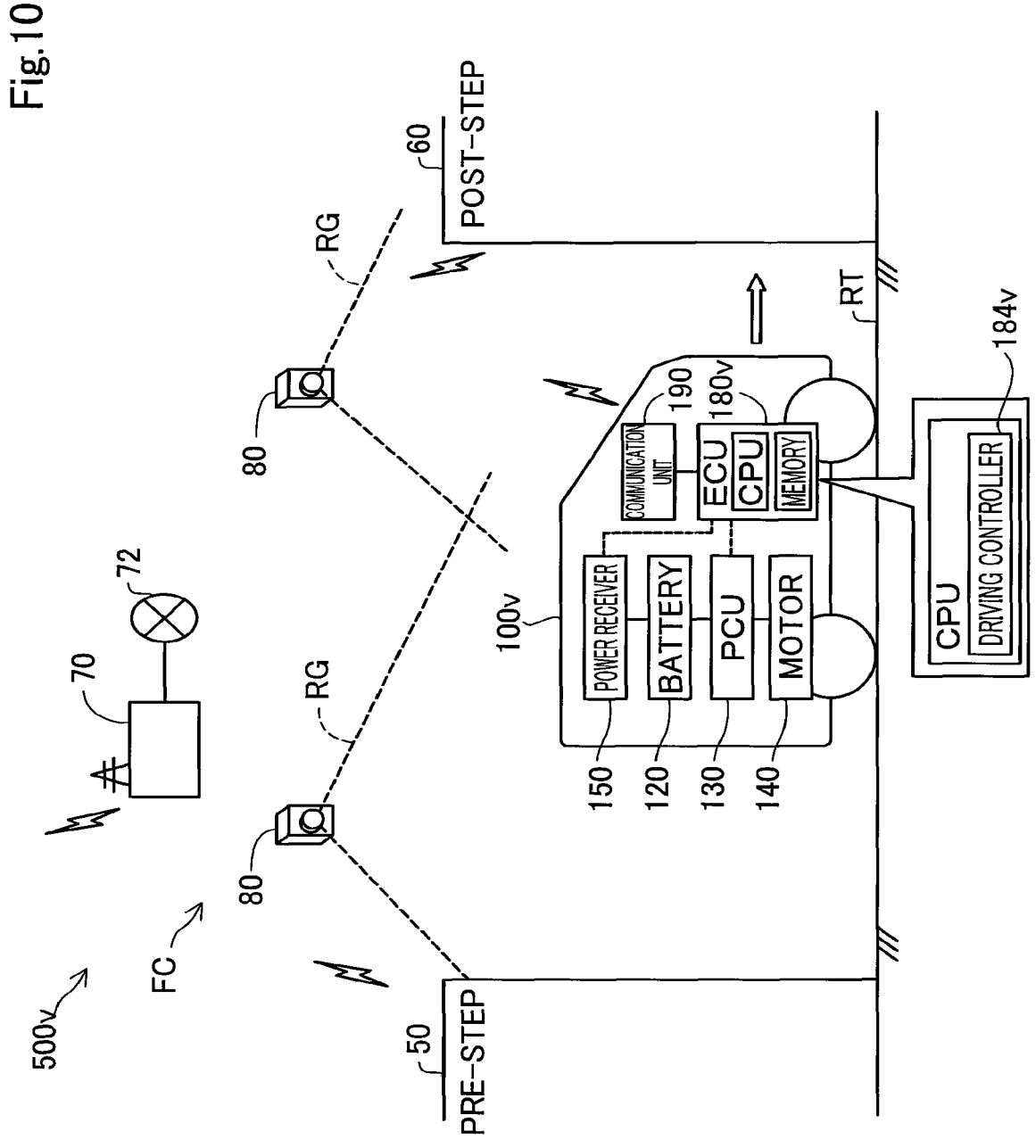
FIG. 10 is an explanatory view showing a schematic configuration of a system according to a second embodiment.

FIG. 10 is an explanatory view showing a schematic configuration of a system 500v according to a second embodiment. The present embodiment differs from the first embodiment in that the system 500v does not includes the server 300. Unless specifically stated, the configuration of the system 500v is otherwise the same as that of the first embodiment.

Figure 11:
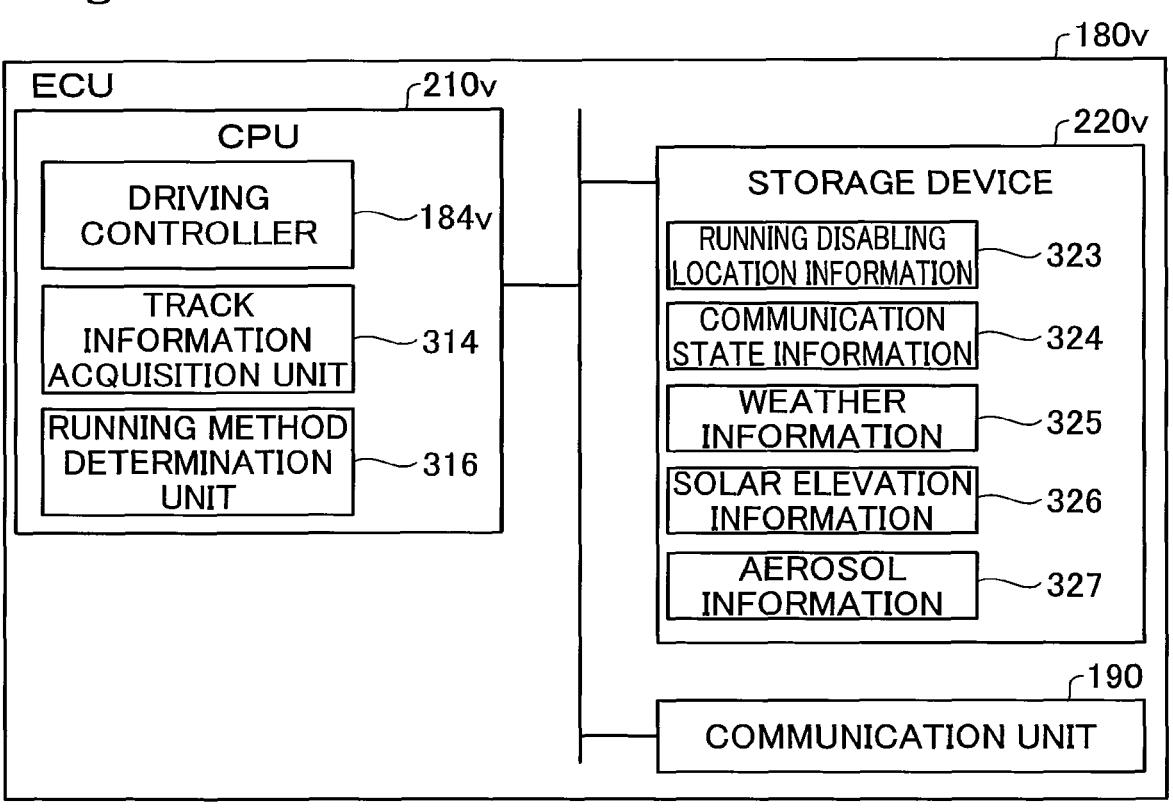
FIG. 11 is a block diagram showing an internal functional configuration of an ECU of a vehicle according to the second embodiment.

FIG. 11 is an explanatory view showing an internal functional configuration of an ECU 180v of a vehicle 100v according to the second embodiment. As shown in FIG. 11, the ECU 180v includes a CPU 210v as a central processing unit, a storage device 220v such as a ROM or a RAM, and the communication unit 190 connected to an interface circuit not shown in the drawings. These units are connected to each other via an internal bus in a manner allowing bidirectional communication therebetween. In the present embodiment, the CPU 210v executes various computer programs stored in the storage device 220v to realize various functions including those of the track information acquisition unit 314 and the running method determination unit 316. The storage device 220v stores various types of information including the running disabling location information 323, the communication state information 324, the weather information 325, the solar elevation information 326, and the aerosol information 327. As will be described later, a driving controller 184v of the present embodiment allows the vehicle 100v to run by autonomous control by the vehicle 100v. More specifically, the driving controller 184v allows the vehicle 100v to run by autonomous control by acquiring detection result from a sensor, generating a running control signal using the detection result, and outputting the generated running control signal to operate each actuator of the vehicle 100v.

Figure 12:
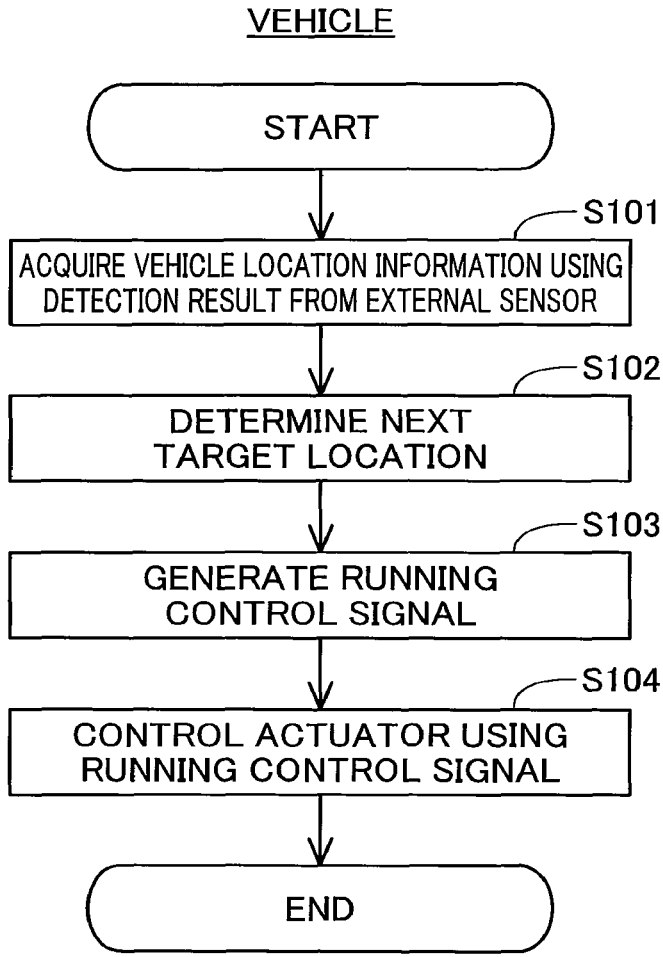
FIG. 12 is a flowchart showing a procedure of running control over the vehicle according to the second embodiment.

FIG. 12 is a flowchart showing a processing procedure for running control of the vehicle 100v in the second embodiment. Since the configuration of the vehicle in the present embodiment is the same as in the first embodiment, the vehicle in the present embodiment is denoted as vehicle 100v for convenience. In step S101, the vehicle 100v acquires vehicle location information using detection result output from the camera 80 as an external sensor. In step S102, the vehicle 100v determines a target location to which the vehicle 100v is to move next. In step S103, the vehicle 100v generates a running control signal for causing the vehicle 100v to run to the determined target location. In step S104, the vehicle 100v controls an actuator using the generated running control signal, thereby causing the vehicle 100v to run by following a parameter indicated by the running control signal. The vehicle 100v repeats the acquisition of vehicle location information, the determination of a target location, the generation of a running control signal, and the control over the actuator in a predetermined cycle. According to the running control in the present embodiment, it is possible to cause the vehicle 100v to run by autonomous control without controlling the vehicle 100v remotely using the server 300.

In the present embodiment, the processing routine in FIG. 4 and the processing routine in FIG. 7 are performed in the same way as in the first embodiment. If the vehicle 100v runs by unmanned driving in each of the processing routines, the vehicle 100v runs by autonomous control by the vehicle 100v, not by remote control over the vehicle 100v by the server 300.

As described above, in the system 500v of the present embodiment, by determining a running method using the track information 322, it becomes possible to determine an appropriate running method of causing the vehicle 100v to run in response to the state of the track RT.

In another embodiment in which the vehicle 100v runs by autonomous control, the server 300 may be provided in the system 500v, for example. In this case, like in the first embodiment, for example, the CPU 310 of the server 300 may function as the track information acquisition unit 314 and the running method determination unit 316. In this case, like in the first embodiment, for example, the storage device 320 of the server 300 may store the running disabling location information 323, the communication state information 324, the weather information 325, the solar elevation information 326, and the aerosol information 327.

C. Other Embodiments (C1) In the example shown in each of the above-described embodiments, the running method determination unit 316 determines a scheduled running route and one complementary running route for different tracks including the standard running route SR1 and the bypass route CR1 connected to the running route SR1. Meanwhile, a scheduled running route and a complementary running route may be set in one running route by using different lanes in the standard running route SR1, for example. Furthermore, the number of complementary running routes is not limited to one but a plurality of complementary running routes may be set. In this case, these complementary running routes are preferably given an order of precedence.

(C2) In the example shown in each of the above-described embodiments, the access point 70 is provided for making radio communication with the communication unit 190 of the vehicle 100. Meanwhile, the access point 70 is omissible if the communication unit 190 of the vehicle 100 makes wire communication with the server 300.

(C3) In the example shown in each of the above-described embodiments, channel utilization is used as a state of communication between the communication unit 190 of the vehicle 100 and the access point 70 as part of the track information 322. Meanwhile, instead of or in addition to channel utilization, radio field strength at the access point 70 may be used.

(C4) In the example shown in each of the above-described embodiments, the weather information 325 includes a sunshine duration at the track RT and a temperature at the track RT. Meanwhile, the weather information 325 may be only one of a sunshine duration at the track RT and a temperature at the track RT.

(C5) In the example shown in each of the above-described embodiments, the running disabling location information 323 includes information about construction carried out on the track RT and information about a stopped vehicle on the track RT. Meanwhile, the running disabling location information 323 may be only one of information about construction carried out on the track RT and information about a stopped vehicle on the track RT.

(C6) In the example shown above, the track information 322 is states of recognition of the evaluation marks AT1 and AT2 in captured images acquired by the first camera 81 and the second camera 82 respectively. Meanwhile, the track information 322 may include a state of recognition of a target in a captured image other than the evaluation marks AT1 and AT2. The track information 322 is not limited to a state of recognition of a target in an image captured by the camera 80 but other items relating to the camera 80 or an image captured by the camera 80 may be used such as visibility from the camera 80, white balance or a color tone in a captured image, for example.

(C7) In the example shown in each of the above-described embodiments, the track information 322 includes the running disabling location information 323, the communication state information 324, the weather information 325, the solar elevation information 326, and aerosol information 327. Meanwhile, the track information 322 may only be the running disabling location information 323, may only be the communication state information 324, may only be the weather information 325, may only be the solar elevation information 326, and may only be the aerosol information 327. The track information 322 may be a combination of these pieces of information.

(C8) In the example shown in each of the above-described embodiments, the running method determination unit 316 evaluates a state of recognition of the vehicle 100 using information about the angle of light entering the camera 80 and information about the quantity of the light entering the camera 80. Meanwhile, the running method determination unit 316 may judge whether a state of recognition of the vehicle 100 by the camera 80 is bad using only one of information about the angle of light entering the camera 80 and information about the quantity of the light entering the camera 80.

(C9) In the example shown in each of the above-described embodiments, the track information acquisition unit 314 acquires a nominal value about solar elevation given from an external agency as the track information 322. Meanwhile, solar elevation may be calculated on the basis of date and time, for example. In another case, a correspondence table showing correspondence between date and time when predefined solar elevation is to be provided and the solar elevation may be stored in advance as the track information 322. In such cases, the running method determination unit 316 evaluates a state of recognition of the vehicle 100 by the camera 80 using a calculated value or a value derived from the correspondence table as information about the angle of light entering the camera 80, instead of using a nominal value about solar elevation.

(C10) In the example shown in each of the above-described embodiments, the running method determination unit 316 judges whether a state of recognition of the vehicle 100 by the camera 80 is bad using both the type of aerosol and the amount of the aerosol as information about the quantity of light entering the camera 80. Meanwhile, the running method determination unit 316 may evaluate a state of recognition of the vehicle 100 by the camera 80 using only one of the type of aerosol and the amount of the aerosol.

(C11) In the example shown in each of the above-described embodiments, the track information acquisition unit 314 acquires a nominal value about at least one of the type of aerosol and the amount of the aerosol given from an external agency. Meanwhile, a detector or the like capable of detecting particles in the air may be located in the vicinity of the track RT and the track information acquisition unit 314 may be configured to acquire detection result from this detector. In this case, the running method determination unit 316 judges whether a state of recognition of the vehicle 100 by the camera 80 is bad using this detection result.

(C12) In the example shown in each of the above-described embodiments, the first camera 81 and the second camera 82 are provided. The first camera 81 is located on the first track SR2 belonging to the track RT, and capable of acquiring an image of the vehicle 100 on the first track SR2. The second camera 82 is located on the second track CR2 belonging to the track RT and different from the first track SR2, and capable of acquiring an image of the vehicle 100 on the second track CR2. Meanwhile, the number of the tracks RT for the vehicle 100 may be one. In this case, only the camera 80 capable of acquiring an image of the vehicle 100 on one track RT may be provided.

(C13) In the configuration given in the example shown in each of the above-described embodiments, if the running method determination unit 316 sets the running route SR to the first track SR2 using the track information 322, a state of recognition of the vehicle 100 in an image of the vehicle 100 acquired by the first camera 81 is better than a state of recognition of the vehicle 100 in an image of the vehicle 100 acquired by the second camera 82. Meanwhile, if the running method determination unit 316 sets a running route to the first track SR2 using information such as a running disabling location other than an image captured by the camera 80, a state of recognition by the second camera 82 may be better than a state of recognition by the first camera 81, or these states of recognition may be substantially equal to each other.

(C14) In the configuration given in the example shown in each of the above-described embodiments, if the running method determination unit 316 sets the running route SR to the first track SR2, the quantity of light entering the second camera 82 is larger than the quantity of light entering the first camera 81. Meanwhile, if the running method determination unit 316 sets a running route to the first track SR2 using information such as a running disabling location other than an image captured by the camera 80, the quantity of light entering the first camera 81 may be larger than the quantity of light entering the second camera 82, or these quantities of light may be substantially equal to each other.

(C15) In the example shown in each of the above-described embodiments, if a state of recognition of the vehicle 100 is worse than a predetermined standard state on both the first track SR2 and the second track CR2, running of the vehicle 100 is stopped. Meanwhile, it is possible to avoid stop of running of the vehicle 100 by causing the vehicle 100 to run to a predetermined standby location, for example. In this case, in order to cause the vehicle 100 to run safely to the standby location, it is preferable that, as a track leading to the standby location in the factory FC, for example, a track realizing a state of recognition of the vehicle 100 better than the standard state be set in advance in a building, for example.

(C16) In the example shown in each of the above-described embodiments, the running method determination unit 316 determines a running method including both the possibility or impossibility of running of the vehicle 100 and a running route along which the vehicle 100 is to run using the track information 322. Meanwhile, the running method determination unit 316 may determine only one of the possibility or impossibility of running of the vehicle 100 and a running route for the vehicle 100 as a running method of causing the vehicle 100 to run.

(C17) In the example shown in each of the above-described embodiments, the track information acquisition unit 314 and the running method determination unit 316 are provided at the server 300. Meanwhile, all or some of functions such as those of the track information acquisition unit 314 and the running method determination unit 316 may be provided at a device other than the server 300 such as the vehicle 100 or an information processor provided in each step.

(C18) In the example shown in the above-described first embodiment, the remote controller 312 acquires an image captured by the camera 80 and performs image analysis on the acquired captured image, thereby acquiring vehicle information including the location or position of the vehicle 100. Meanwhile, if the vehicle detector is other than the camera 80, driving control may be implemented over the vehicle 100 by remote control by analyzing detection result acquired by the vehicle detector other than the camera 80. In another case, the camera 80 and the vehicle detector other than the camera 80 may be used in combination. Specifically, in each of the above-described embodiments, the external sensor is not limited to the camera 80 but may be the distance measuring device, for example. The distance measuring device is a light detection and ranging (LiDAR) device, for example. In this case, detection result output from the external sensor may be three-dimensional point cloud data representing the vehicle 100. The server 300 and the vehicle 100 may acquire the vehicle location information through template matching using the three-dimensional point cloud data as the detection result and reference point cloud data, for example.

(C19) In each of the above-described embodiments, various types of moving objects other than the vehicle 100 may be moved by unmanned driving.

(C20) In the example shown in each of the above-described embodiments, both the scheduled running route determination process and the running route determination process are performed. Meanwhile, the scheduled running route determination process is omissible. In this case, in the running route determination process, step S10 to step S40 are performed with timing before step S150, and the track information 322 acquired in steps from step S10 to step S40 is used in judging the possibility or impossibility of running of the vehicle 100 in step S150.

(C21) In the above-described first embodiment, the server 300 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server 300 may acquire vehicle location information, determine a target location to which the vehicle 100 is to move next, and generate a route from a current location of the vehicle 100 indicated by the acquired vehicle location information to the target location. The server 300 may generate a route to the target location between the current location and a destination or generate a route to the destination. The server 300 may transmit the generated route to the vehicle 100. The vehicle 100 may generate a running control signal in such a manner as to cause the vehicle 100 to run along the route received from the server 300 and control an actuator using the generated running control signal.

(2) The server 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(C22) In the above-described second embodiment, the vehicle 100v may be equipped with an internal sensor, and detection result output from the internal sensor may be used in at least one of generation of a route and generation of a running control signal. For example, the vehicle 100v may acquire detection result from the internal sensor, and in generating the route, may reflect the detection result from the internal sensor in the route. The vehicle 100v may acquire detection result from the internal sensor, and in generating the running control signal, may reflect the detection result from the internal sensor in the running control signal.

(C23) In the above-described second embodiment, the vehicle 100v acquires vehicle location information using detection result from the external sensor. By contrast, the vehicle 100v may be equipped with an internal sensor, the vehicle 100v may acquire vehicle location information using detection result from the internal sensor, determine a target location to which the vehicle 100v is to move next, generate a route from a current location of the vehicle 100v indicated by the acquired vehicle location information to the target location, generate a running control signal for running along the generated route, and control an actuator of the vehicle 100v using the generated running control signal. In this case, the vehicle 100v is capable of running without using any detection result from an external sensor. The vehicle 100v may acquire target arrival time or traffic congestion information from outside the vehicle 100v and reflect the target arrival time or traffic congestion information in at least one of the route and the running control signal. The functional configuration of the system 500v may be entirely provided at the vehicle 100v. Specifically, the processes realized by the system 500v in the present disclosure may be realized by the vehicle 100v alone.

(C24) In the above-described first embodiment, the server 300 automatically generates a running control signal to be transmitted to the vehicle 100. By contrast, the server 300 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device.

(C25) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(C26) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C27) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The present disclosure is not limited to the embodiments described above and is able to be realized with various configurations without departing from the spirit thereof. For example, technical features in the embodiments corresponding to the technical features in the aspects described in the section of SUMMARY are able to be replaced with each other or combined together as necessary in order to solve part or the whole of the problems described previously or to achieve part or the whole of the effects described previously. When the technical features are not described as essential features in the present specification, they are able to be deleted as necessary.

What is claimed is:

1. A system used in a factory for manufacture of a vehicle, comprising:

a remote controller that causes the vehicle to run by remote control, the vehicle being capable of running along a track in the factory during a course of manufacture, the vehicle including a vehicle communication unit and a driving controller, the vehicle communication unit having a communication function, the driving controller implementing driving control over the vehicle;

a track information acquisition unit that acquires track information that is information about an environment of a track on which the vehicle is configured to run by the remote control;

a running method determination unit that determines a running method using the acquired track information, the running method including a running route along which the vehicle is to run, the running route being determined in advance before the vehicle runs on the running route;

at least one camera capable of acquiring an image of the vehicle used for the remote control; and a radio communication unit for making radio communication with the vehicle communication unit, wherein the track information is acquired using an image captured by the at least one camera, the track information includes first and second information, the first information including at least one of:

weather information at the track, the weather information including at least one of a sunshine duration at the track and a temperature at the track;

information about construction carried out on the track;

information about a stopped vehicle on the track;

information about an angle of light entering the at least one camera;

information about a quantity of light entering the at least one camera;

information about a type of aerosol; and information about an amount of the aerosol, the second information including at least one of:

information indicating a state of recognition of a target in an image of the target acquired by the at least one camera; and information about a state of communication between the vehicle communication unit on the track and the radio communication unit, the state of recognition being represented by a probability that the target in the image matches a reference target, the at least one camera includes a first camera located on a first track belonging to the track, the first camera being capable of acquiring the image of the vehicle on the first track, and a second camera located on a second track belonging to the track, the second camera being capable of acquiring the image of the vehicle on the second track, the second track being different from the first track, before preparation for running of the vehicle by the remote control is completed, the running method determination unit determines, based on the first information, the first track as the running route and the second track as the complementary running route, and at a timing after the preparation is completed and before running of the vehicle is started, the running method determination unit determines, based on the second information, whether to change the running route from the first track to the second track.

2. The system according to claim 1, wherein the state of the communication is at least one of radio field strength at the radio communication unit and channel utilization at the radio communication unit.

3. The system according to claim 1, wherein the track information acquisition unit acquires a nominal value about solar elevation given from an external agency, and the running method determination unit implements the evaluation using the nominal value as the information about the angle of the light entering the camera.

4. The system according to claim 1, wherein the running method determination unit implements the evaluation using at least one of a type of aerosol and an amount of the aerosol as the information about the quantity of the light entering the camera.

5. The system according to claim 4, wherein the track information acquisition unit acquires a nominal value about at least one of the type of the aerosol and the amount of the aerosol given from an external agency, and the running method determination unit implements the evaluation using the nominal value.

6. The system according to claim 1, wherein when the running method determination unit sets the running route to the first track, a quantity of light entering the second camera is larger than a quantity of light entering the first camera.

7. The system according to claim 1, wherein when a state of recognition of the vehicle is worse than a predetermined standard state on both the first track and the second track, the running method determination unit determines to stop running of the vehicle.

* * * * *